(12) United States Patent
Takahashi et al.

(10) Patent No.: US 8,977,464 B1
(45) Date of Patent: Mar. 10, 2015

(54) METHOD AND APPARATUS FOR PERFORMING DRIVING ASSISTANCE

(71) Applicant: Hitachi, Ltd., Chiyoda-ku, Tokyo (JP)

(72) Inventors: Junya Takahashi, Munich (DE); Heiko Altmannshofer, Tann (DE); Makoto Yamakado, Tokyo (JP); Atsushi Yokoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/168,304

(22) Filed: Jan. 30, 2014

(30) Foreign Application Priority Data

Sep. 30, 2013 (EP) .................................. 13186786

(51) Int. Cl.
- *B60W 40/105* (2012.01)
- *B60W 40/10* (2012.01)
- *B60W 30/18* (2012.01)
- *G05D 13/02* (2006.01)

(52) U.S. Cl.
CPC .............. *B60W 30/18* (2013.01); *G05D 13/02* (2013.01)
USPC .......................................................... 701/70

(58) Field of Classification Search
CPC .............. B60T 8/1755; B60T 8/17551; B60K 2031/0033; B60K 31/0008; B60K 2031/005
USPC ......................................... 701/70, 79, 93, 96
See application file for complete search history.

(56) References Cited

U.S. PATENT DOCUMENTS

| | | | |
|---|---|---|---|
| 8,433,493 B2 | 4/2013 | Takahashi et al. | |
| 2009/0234552 A1* | 9/2009 | Takeda et al. | 701/96 |
| 2012/0179349 A1* | 7/2012 | Yamakado et al. | 701/89 |
| 2012/0209489 A1 | 8/2012 | Saito et al. | |
| 2012/0316744 A1* | 12/2012 | Shimura et al. | 701/72 |
| 2013/0131947 A1 | 5/2013 | Takahashi et al. | |

FOREIGN PATENT DOCUMENTS

| | | |
|---|---|---|
| EP | 1 992 537 A2 | 11/2008 |
| JP | 2010-260544 A | 11/2010 |
| JP | 2011-88576 A | 5/2011 |
| JP | 2012-30674 A | 2/2012 |
| JP | 2012-210935 A | 11/2012 |
| JP | 2013-14202 A | 1/2013 |

OTHER PUBLICATIONS

Takahashi et al., "Development of an Adaptive Longitudinal Control System with Predicted Lateral Motion Information", 22$^{nd}$ Aachen Colloquium Automobile and Engine Technology 2013, pp. 767-789.

* cited by examiner

*Primary Examiner* — Mary Cheung
*Assistant Examiner* — Rodney Butler
(74) *Attorney, Agent, or Firm* — Crowell & Moring LLP

(57) ABSTRACT

The present invention relates to methods and apparatuses for performing driving assistance for a controlled vehicle, involving determining a longitudinal acceleration target value on the basis of a lateral acceleration of the controlled vehicle and one or more setting parameters, and controlling a longitudinal acceleration of the controlled vehicle on the basis of the calculated longitudinal acceleration target value. According to the invention, a lateral acceleration acting, during cornering, on a proceeding vehicle, which moves in the longitudinal direction on the road ahead of the controlled vehicle, is estimated, and the one or more setting parameters for the calculation of the longitudinal acceleration target value are set based on the estimated lateral acceleration acting on the proceeding vehicle during cornering.

16 Claims, 15 Drawing Sheets

METHOD AND APPARATUS FOR PERFORMING DRIVING ASSISTANCE

The present invention relates to a method and an apparatus for performing driving assistance for a vehicle.

BACKGROUND

In the prior art of performing driving assistance for a vehicle, there are known the concepts of so-called Electronic Stability Control (ESC), also referred to as Electronic Stability Program (ESP) or Dynamic Stability Control (DSC), which is a computer-implemented control technology for improving the safety of a vehicle's stability by detecting and reducing loss of traction, wherein the control target is the yaw moment of the vehicle.

Other control concepts for performing driving assistance for a vehicle such as so-called cruise control (CC) and adaptive cruise control (ACC) are known. According to cruise control (CC), the longitudinal acceleration of a controlled vehicle is controlled based on a comparison of a user-set target speed and a current speed of the controlled vehicle. If the current speed is lower than the user-set target speed, the controlled vehicle will be positively accelerated until the current speed matches the user-set target speed, and if the current speed is larger than the user-set target speed, the controlled vehicle will be decelerated until the current speed matches the user-set target speed. According to adaptive cruise control (ACC), the vehicle will be controlled similar to the above-described cruise control (CC) but, in addition, as soon as and as long as it is determined that a distance to a proceeding vehicle is equal or lower than a user-set or pre-set target distance, the longitudinal acceleration of the controlled vehicle will be controlled such as to keep the target distance to the proceeding vehicle at least as long as the proceeding vehicle is traveling at a speed equal to or lower than the target speed.

Recently, according to EP 1 992 537 A2, another concept for performing driving assistance for a vehicle was proposed, which concept (referred to as e.g. G-Vectoring Control, GVC) can be provided alternatively or also additionally to the above-mentioned Electronic Stability Control (ESC), in which the control target is the longitudinal acceleration of the vehicle and the control is based on a lateral acceleration and lateral jerk of the vehicle. The longitudinal acceleration control concept of GVC may be extended as Preview G-Vectoring Control (PGVC) by using a predicted lateral acceleration and lateral jerk of the vehicle.

Specifically, according to a control concept, a lateral acceleration of the vehicle, which is an acceleration of the vehicle in a lateral direction perpendicular to a longitudinal direction of the vehicle corresponding to a moving direction of the vehicle, and a lateral jerk of the vehicle, which is a jerk of the vehicle in the lateral direction, are determined. Based on the determined lateral acceleration and lateral jerk, a longitudinal acceleration of the vehicle is controlled.

While the principle concept of control of longitudinal acceleration of the vehicle and the control on the basis of lateral jerk has been developed, it is desirable to modify and develop further the control concept of EP 1 992 537 A2 for providing improved safety and higher driver's comfort and convenience, and in particular for providing improved vehicle handling and cornering behavior.

SUMMARY OF THE INVENTION

In view of the above object, there is proposed a method for performing driving assistance for a vehicle according to claim 1 and an apparatus for performing driving assistance for a vehicle according to claim 15 according to the present invention. Further, a computer program product according to claim 16 is proposed. Dependent claims relate to some of the preferred embodiments of the present invention.

According to a general aspect of the present invention, there may be provided a method or apparatus for performing driving assistance for a vehicle in which a lateral acceleration and a lateral jerk of the moving vehicle or at least parameters indicative of the lateral acceleration and the lateral jerk of the moving vehicle are determined, in particular regularly determined or even continuously monitored, and a longitudinal acceleration of the moving vehicle may then be controlled on the basis of the determined lateral acceleration and lateral jerk.

Also, in addition or as an alternative there may be provided a method or apparatus for performing driving assistance for a vehicle in which a lateral acceleration and a lateral jerk of the moving vehicle or at least parameters indicative of the lateral acceleration and the lateral jerk of the moving vehicle are predicted (estimated) in advance based on a vehicle speed of the controlled vehicle and on the basis of curvature information such as a curvature of a curve of the road ahead of the controlled vehicle, e.g. at a preview point, in particular regularly predicted (estimated) or even continuously predicted (estimated), and a longitudinal acceleration of the moving vehicle may then be controlled on the basis of the predicted (estimated) lateral acceleration and lateral jerk, e.g. on the basis of a time derivative of the curvature of a curve of the road ahead of the controlled vehicle and the vehicle speed of the controlled vehicle.

According to a first aspect of the invention, there is proposed a method for performing driving assistance for a controlled vehicle moving in a longitudinal direction on a road, comprising determining a longitudinal acceleration target value on the basis of a (determined and/or predicted/estimated) lateral acceleration of the controlled vehicle and one or more setting parameters, and controlling a longitudinal acceleration of the controlled vehicle on the basis of the calculated longitudinal acceleration target value.

According to the first aspect, the method may further comprise estimating or determining on a driving-character (driving characteristics) of a proceeding vehicle, which moves in the longitudinal direction on the road ahead of the controlled vehicle, and setting the one or more setting parameters for the calculation of the longitudinal acceleration target value based on the estimated or determined driving-character (driving characteristics) of the proceeding vehicle during cornering.

In preferred aspects, a driving characteristics of the proceeding vehicle may be determined or estimated on the basis of information received from the proceeding vehicle and/or from a data center which has information of the proceeding vehicle, using a communication protocol between the controlled vehicle and the proceeding vehicle and/or the data center. Preferably, a driving characteristics of the proceeding vehicle is estimated or determined on the basis of information detected by sensors from the controlled vehicle, a driving characteristics of the proceeding vehicle is estimated or determined based on the longitudinal acceleration and/or lateral acceleration acting on the proceeding vehicle, and/or a driving characteristics of the proceeding vehicle is estimated based on a predicted longitudinal acceleration and/or lateral acceleration, which will act on the proceeding vehicle.

It is to be noted that the information on a driving characteristics of the proceeding vehicle (which may indicate a speed, position, lateral acceleration, and/or longitudinal acceleration of the proceeding vehicle) may be obtained via data communications being established between the controlled vehicle and the proceeding vehicle and/or between a data center and the controlled vehicle, wherein the data sensor obtains the data from the proceeding vehicle or from other vehicle external sensors. In addition or alternatively, information on the driving characteristics may be obtained from sensor data e.g. from sensors of the controlled vehicle, which may detect a relative speed and relative position between the controlled vehicle and the proceeding vehicle. Then, speed, position and longitudinal acceleration of the proceeding vehicle may be determined based on speed and/or position of the controlled vehicle and relative speed and/or relative position between the controlled vehicle and the proceeding vehicle. Lateral acceleration of the proceeding vehicle may be estimated based on the estimated speed and position of the proceeding vehicle and based on curvature information indicating a curvature of a road at the position of the proceeding vehicle.

According to the first aspect, the method may comprise, in addition to or representing the step of estimating/determining the driving characteristics of the proceeding vehicle, estimating (e.g. predicting) or determining a lateral acceleration which is acting or will act, during cornering, on a proceeding vehicle, which moves in the longitudinal direction on the road ahead of the controlled vehicle, and setting the one or more setting parameters for the calculation of the longitudinal acceleration target value based on the estimated lateral acceleration which is acting or will act on the proceeding vehicle during cornering.

The present invention allows to advantageously increase the safety and driving convenience for the driver of the controlled vehicle in that the settings of the setting parameters of the longitudinal acceleration control are adjusted also depending on an estimated lateral acceleration of the proceeding vehicle, if any.

For example, controlling the longitudinal acceleration without any knowledge about the proceeding vehicle may disadvantageously lead to a situation in which the distance to the proceeding vehicle may reduce below a threshold during cornering. Then, the driver of the controlled vehicle may need to actively use a brake in addition to the longitudinal acceleration control operation in order to avoid reducing the distance to the proceeding vehicle further, or an adaptive cruise control may activate in order to reduce the speed of the controlled vehicle in order to avoid reducing the distance to the proceeding vehicle further, thereby reducing the driving convenience for the driver of the controlled vehicle.

However, according to the present invention, longitudinal acceleration control may be based on an estimated lateral acceleration acting on the proceedings vehicle by setting the one or more setting parameters for the calculation of the longitudinal acceleration target value based on the estimated lateral acceleration acting on the proceeding vehicle during cornering.

Especially, by adjusting the setting parameters such that longitudinal acceleration control based on the lateral acceleration of the controlled vehicle is adapted to the estimated lateral acceleration of the proceeding vehicle advantageously helps to avoid that the distance to the proceeding vehicle is reduced too much so that there is no necessity for the driver to actively decelerate by using the brake or that there is no necessity that the adaptive cruise control may activate.

Preferably, the method further comprises determining a speed of the proceeding vehicle, wherein the lateral acceleration acting on the proceeding vehicle is preferably estimated based on the determined speed of the proceeding vehicle and curvature information. This has the advantage that the lateral acceleration acting on the proceeding vehicle can be reliably and accurately estimated based on curvature information such as a curvature of the road ahead of the controlled vehicle as can be derived e.g. from map data (e.g. navigation map data). Preferably, the method may further comprise determining a position of the proceeding vehicle, and determining a curvature of the road at the position of the proceeding vehicle based on map data, wherein the lateral acceleration acting on the proceeding vehicle is preferably estimated based on the determined speed of the proceeding vehicle and the determined curvature of the road at the position of the proceeding vehicle.

According to the above aspect, it is preferable that the position of the proceeding vehicle is determined based on position data received from the proceeding vehicle; and/or the method may further comprise determining a position of the controlled vehicle, and determining a distance from the controlled vehicle to the proceeding vehicle (e.g. by means of a sensor such as radar, sonar, or light reflection etc.), wherein the position of the proceeding vehicle is preferably determined based on the position of the controlled vehicle and the determined distance to the proceeding vehicle.

According to another preferred aspect, the step of determining the longitudinal acceleration target value on the basis of a lateral acceleration of the controlled vehicle and one or more setting parameters is performed in one of a plurality of setting modes, wherein the one or more setting parameters may preferably be set differently in each of the plural setting modes preferably such that an average lateral acceleration and/or a maximum lateral acceleration acting on the controlled vehicle during cornering is different for each of the plural setting modes when being controlled based on the longitudinal acceleration control. Accordingly, possibly in accordance with driver's preferences, there may be provided setting modes providing less longitudinal deceleration during cornering (at the entrance of the curve) and/or higher positive acceleration at the exit of a curve than other setting modes.

In the above preferred aspect, it is further preferable that the plural setting modes comprise at least a first setting mode and a second setting mode, an average lateral acceleration and/or a maximum lateral acceleration acting on the controlled vehicle during cornering being larger in the second setting mode than in the first setting mode, wherein the step of setting the one or more setting parameters for the calculation of the longitudinal acceleration target value based on the estimated lateral acceleration acting on the proceeding vehicle during cornering preferably comprises selecting the first setting mode, if an absolute value of the estimated lateral acceleration acting on the proceeding vehicle is smaller than a threshold value, and/or selecting the second setting mode, if the absolute value of the estimated lateral acceleration acting on the proceeding vehicle is larger than the threshold value.

Accordingly, even if a driver of the controlled vehicle may have pre-selected the second setting mode as a default setting according to the driver's preferences, when it is determined that the estimated lateral acceleration acting on the proceeding vehicle during cornering may be less than the threshold, still the first setting mode will actually be selected for the longitudinal acceleration control, thereby leading to a lower average lateral acceleration and/or a maximum lateral acceleration acting on the controlled vehicle during cornering compared to the pre-set control behavior so that it can be efficiently and advantageously avoided that the distance to the proceeding vehicle reduces too much during cornering.

In further embodiments, the method may further comprise a step of determining which setting mode has been pre-set as a default setting according to the driver's preferences, i.e.

whether the driver has pre-selected the first or second setting mode (or another setting mode). Preferably, the above selection of a setting mode can be performed further in dependence of the pre-set setting mode. For example, when the user has pre-set the first setting mode (or another setting mode in which the average lateral acceleration and/or the maximum lateral acceleration acting on the controlled vehicle during cornering is even lower than in the first setting mode), the second setting mode will preferably not be selected even in case the absolute value of the estimated lateral acceleration acting on the proceeding vehicle is larger than the threshold value. Instead, the pre-set setting mode is preferably maintained. Only in case the user has pre-set the second setting mode (or another higher setting mode in which the average lateral acceleration and/or the maximum lateral acceleration acting on the controlled vehicle during cornering is even higher than in the second setting mode), the second setting mode (or even a higher setting mode) is preferably selected in case the absolute value of the estimated lateral acceleration acting on the proceeding vehicle is larger than the threshold value.

Specifically, in the above preferred aspect, it is further preferable that the plural setting modes comprise at least a first setting mode and a second setting mode, an average lateral acceleration and/or a maximum lateral acceleration acting on the controlled vehicle during cornering being larger in the second setting mode than in the first setting mode, wherein the step of setting the one or more setting parameters for the calculation of the longitudinal acceleration target value based on the estimated lateral acceleration acting on the proceeding vehicle during cornering preferably comprises selecting the first setting mode if an absolute value of the estimated lateral acceleration acting on the proceeding vehicle is smaller than a threshold value (although the driver may have pre-selected the second setting mode), selecting the first setting mode if the absolute value of the estimated lateral acceleration acting on the proceeding vehicle is larger than the threshold value but the user has pre-selected the first setting mode, and/or selecting the second setting mode, if the absolute value of the estimated lateral acceleration acting on the proceeding vehicle is larger than the threshold value and the user has pre-selected the second setting mode.

In all of the above aspects, the position of the proceeding vehicle may be determined based on position data received from the proceeding vehicle and/or the speed of the proceeding vehicle may be determined based on speed data received from the proceeding vehicle. Also, lateral and/or longitudinal acceleration acting on the proceeding vehicle may be determined based on sensor data received from the proceeding vehicle. Alternatively, or in addition, the position of the proceeding vehicle may be determined based on a relative position of the proceeding vehicle detected by sensors from the controlled vehicle (e.g. based on sensed direction and/or distance to the proceeding vehicle, and/or the speed of the proceeding vehicle may be determined based on a relative speed to the controlled vehicle based on sensor data such as camera, sonar and/or radar.

According to another preferred aspect, the one or more setting parameters comprise at least one gain factor for control of negative longitudinal acceleration of the vehicle, wherein an absolute value of the longitudinal acceleration target value increases with increasing gain factor and decreases with decreasing gain factor. Preferably, the step of setting the one or more setting parameters for the calculation of the longitudinal acceleration target value based on the estimated lateral acceleration acting on the proceeding vehicle during cornering comprises setting the at least one gain factor for control of negative longitudinal acceleration of the vehicle based on a function of the estimated lateral acceleration acting on the proceeding vehicle during cornering. Preferably, the at least one gain factor for control of negative longitudinal acceleration of the vehicle as a function of the estimated lateral acceleration acting on the proceeding vehicle during cornering decreases with increasing absolute value of the estimated lateral acceleration acting on the proceeding vehicle during cornering.

Accordingly, during negative longitudinal acceleration control (deceleration control) of the controlled vehicle (e.g. at an entrance of a curve), the at least one gain factor will be determined on the basis of the function of the absolute value of the estimated lateral acceleration of the proceeding vehicle which decreases with increasing absolute value of the estimated lateral acceleration acting on the proceeding vehicle.

That is, when it is determined that the estimated lateral acceleration acting on the proceeding vehicle is lower, thereby indicating a lower cornering speed of the proceeding vehicle, the at least one gain factor will be set as a higher value, thereby leading to a stronger longitudinal deceleration of the controlled vehicle, and when it is determined that the estimated lateral acceleration acting on the proceeding vehicle is higher, thereby indicating a higher cornering speed of the proceeding vehicle, the at least one gain factor will be set as a lower value, thereby leading to a less strong longitudinal deceleration of the controlled vehicle.

Accordingly, it is efficiently, reliably and conveniently possible to perform the longitudinal acceleration control such that the distance to the proceeding vehicle does not easily decrease below a safety distance at which either the driver may need to actively decelerate or that an additionally provided adaptive cruise control may need to decelerate the vehicle at the expense of the driver's convenience and driving comfort.

According to another preferred aspect, the one or more setting parameters comprise at least one gain factor for control of positive longitudinal acceleration of the vehicle, wherein an absolute value of the longitudinal acceleration target value increases with increasing gain factor and decreases with decreasing gain factor. Preferably, the step of setting the one or more setting parameters for the calculation of the longitudinal acceleration target value based on the estimated lateral acceleration acting on the proceeding vehicle during cornering comprises setting the at least one gain factor for control of positive longitudinal acceleration of the vehicle based on a function of the estimated lateral acceleration acting on the proceeding vehicle during cornering, the at least one gain factor for control of positive longitudinal acceleration of the vehicle as a function of the estimated lateral acceleration acting on the proceeding vehicle during cornering increases with increasing absolute value of the estimated lateral acceleration acting on the proceeding vehicle during cornering.

Accordingly, during positive longitudinal acceleration control (positive acceleration control) of the controlled vehicle (e.g. at an exit of a curve), the at least one gain factor will be determined on the basis of the function of the absolute value of the estimated lateral acceleration of the proceeding vehicle which increases with increasing absolute value of the estimated lateral acceleration acting on the proceeding vehicle.

That is, when it is determined that the estimated lateral acceleration acting on the proceeding vehicle is lower, thereby indicating a lower cornering speed of the proceeding vehicle, the at least one gain factor will be set as a lower value, thereby leading to a less strong positive longitudinal acceleration of the controlled vehicle, and when it is determined that the estimated lateral acceleration acting on the proceeding vehicle is higher, thereby indicating a higher cornering speed of the proceeding vehicle, the at least one gain factor will be set as a higher value, thereby leading to a stronger positive longitudinal acceleration of the controlled vehicle.

Accordingly, it is efficiently, reliably and conveniently possible to perform the longitudinal acceleration control such that the distance to the proceeding vehicle does not easily decrease below a safety distance at which either the driver may need to actively decelerate or that an additionally provided adaptive cruise control may need to decelerate the vehicle at the expense of the driver's convenience and driving comfort.

According to another preferred aspect, determining the longitudinal acceleration target value may comprise determining a second longitudinal acceleration target value being calculated on the basis of a determined lateral acceleration and a corresponding lateral jerk of the vehicle during cornering.

According to another preferred aspect, which may be used alternatively or in addition to the above aspect, determining the longitudinal acceleration target value may comprise determining a third longitudinal acceleration target value being calculated on the basis of an estimated lateral acceleration of the vehicle at a preview point, which is preferably located ahead of the controlled vehicle at a predetermined preview distance or at a preview distance which preferably is calculated on the basis of a predetermined preview time and the current speed of the vehicle, the estimated lateral acceleration at a preview point being preferably calculated on the basis of an estimation of curvature of the road at the preview point and the current speed of the controlled vehicle.

In preferred aspects of the invention, the longitudinal acceleration target value is determined based on the second longitudinal acceleration target value and the third longitudinal acceleration target value.

According to a second aspect of the present invention, there is proposed an apparatus (such as a control unit or control system integrated in or mountable to a vehicle) for performing driving assistance for a controlled vehicle moving in a longitudinal direction on a road according to a method as described in any one of the preceding claims, comprising longitudinal acceleration target value determining means for determining a longitudinal acceleration target value on the basis of a lateral acceleration of the controlled vehicle and one or more setting parameters, and longitudinal acceleration control means for controlling a longitudinal acceleration of the controlled vehicle on the basis of the calculated longitudinal acceleration target value.

The apparatus may comprise driving characteristics determining means for estimating or determining driving characteristics of a proceeding vehicle, which moves in the longitudinal direction on the road ahead of the controlled vehicle, and setting means for setting the one or more setting parameters for the calculation of the longitudinal acceleration target value based on the estimated or predicted driving characteristics of the proceeding vehicle.

Specifically, there may be provided an apparatus (such as a control unit or control system integrated in or mountable to a vehicle) for performing driving assistance for a controlled vehicle moving in a longitudinal direction on a road according to a method as described in any one of the above first aspect and preferred aspects thereof. The apparatus may comprise longitudinal acceleration target value determining means for determining a longitudinal acceleration target value on the basis of a lateral acceleration of the controlled vehicle and one or more setting parameters, and longitudinal acceleration control means for controlling a longitudinal acceleration of the controlled vehicle on the basis of the calculated longitudinal acceleration target value. In addition, the apparatus may further comprise lateral acceleration estimation means for estimating a lateral acceleration acting, during cornering, on a proceeding vehicle, which moves in the longitudinal direction on the road ahead of the controlled vehicle, and setting means for setting the one or more setting parameters for the calculation of the longitudinal acceleration target value based on the estimated lateral acceleration acting on the proceeding vehicle during cornering.

According to a third aspect of the present invention, there is proposed program product comprising computer program means for causing a vehicle control apparatus to execute the steps of a method as described in any one of the above first aspect and preferred aspects thereof.

In the above, the term "acceleration" may refer to a derivative of speed (or velocity) with respect to time and the term jerk refers to a derivative of acceleration with respect to time, or to a second derivative of speed (or velocity) with respect to time. Typically, if not stated otherwise, the term "acceleration" as used in the present disclosure may include positive acceleration (i.e. increasing speed) as well as negative acceleration (i.e. deceleration or reducing speed).

A lateral direction of the vehicle can also be referred to as a direction of the pitch axis of the vehicle and a longitudinal direction of the vehicle can be referred to as a direction of the roll axis of the vehicle.

Moreover, while velocity, acceleration and jerk are in general vector quantities, terms such as lateral acceleration, longitudinal acceleration, and lateral jerk are typically referring to scalar quantities.

In a Cartesian coordinate system of the vehicle having the yaw, pitch and roll axes as principal axes of the coordinate system, a lateral acceleration refers to the pitch axis coordinate of the acceleration vector and a longitudinal acceleration refers to the roll axis coordinate of the acceleration vector. Similarly, a lateral jerk refers to the pitch axis coordinate of the jerk vector.

In the driving control, while the longitudinal acceleration may preferably need to discriminate between positive acceleration (acceleration of the vehicle in the sense of increasing speed) and negative acceleration (deceleration) of the vehicle in the sense of decreasing speed and/or braking, the lateral acceleration does not necessarily need to discriminate between positive lateral acceleration (i.e. acceleration towards the left/right) and negative lateral acceleration (i.e. acceleration towards the right/left) since driving control should preferably be performed similar for left turn and right turn driving.

Therefore, a lateral acceleration may similarly refer to the absolute value of the pitch axis coordinate of the acceleration vector, however, then a lateral jerk may preferably refer to the derivative of the absolute value of the lateral acceleration with respect to time. On the other hand, a lateral jerk preferably again may preferably need to discriminate between positive jerk (i.e. increasing lateral acceleration) and negative jerk (i.e. decreasing lateral acceleration).

DETAILED DESCRIPTION OF FIGURES AND PREFERRED EMBODIMENTS OF THE PRESENT INVENTION

Preferred embodiments of the present invention will be described below with reference to the accompanying figures. The described features and aspects of the embodiments may be modified or combined to form further embodiments of the present invention.

Longitudinal acceleration control for cornering (named Preview G-Vectoring Control: PGVC) is one of the driver assistance systems to reduce the driver's pedal works on the winding road driving. This system can decelerate/accelerate the vehicle automatically depend on the curvature of driving course. However it has no function to decelerate/accelerate the vehicle to keep the distance from a proceeding vehicle. Adaptive Cruise Control (ACC) is the function to keep the distance from a proceeding vehicle, and combination of PGVC and ACC would be one of the solutions to keep the distance from the proceeding vehicle during the cornering scenario. It is useful to deal these two functions independently from the view point of tuning/adding/replacing/reducing these functions. However, independent longitudinal acceleration controls by these different functions may change the longitudinal acceleration discontinuously, and it will give discomfort to a driver.

To avoid this discontinuous change of longitudinal acceleration, PGVC has an input signal from object detection device and changes the longitudinal acceleration control for cornering based on proceeding vehicle information (distance, speed). PGVC parameters are set to decelerate/accelerate the vehicle for cornering as the proceeding vehicle doing. For example, if the proceeding vehicle drives the curve slowly to reduce the lateral acceleration during cornering, ego vehicle also drives the curve slowly, even though the driver selected high-acceleration cornering setting. As the result, ego vehicle keeps the distance from the proceeding vehicle during cornering, and deceleration control by ACC to keep a safe time gap to proceeding vehicle would not be activated; longitudinal acceleration during cornering would be smooth.

Figure 1:
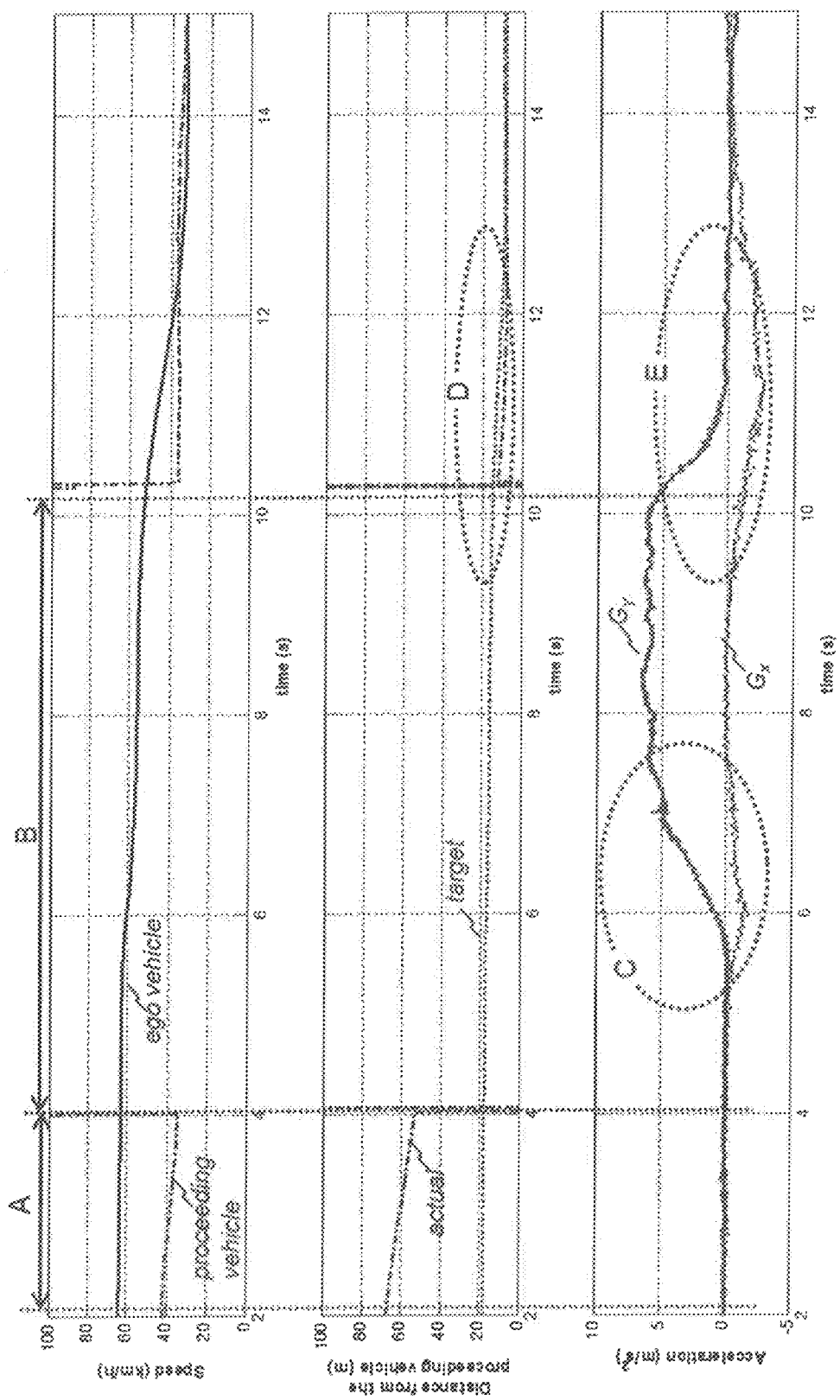
FIG. 1 exemplarily shows a time diagram of the speed of an ego vehicle and proceeding vehicle, the distance from the proceeding vehicle, the longitudinal-acceleration (Gx) and lateral-acceleration (Gy) during driving on a curve with a proceeding vehicle. Gx is controlled by PGVC and ACC system.

FIG. 1 exemplarily shows a speed V of an ego vehicle (solid line) and a proceeding vehicle (dash-dot line), the distance from the proceeding vehicle (dash-dot line) and the target distance (dot line), longitudinal-acceleration (Gx) and lateral-acceleration (Gy) during driving on a curve with a proceeding vehicle. The ego vehicle is the vehicle to be controlled, also referred to as a controlled vehicle below.

The longitudinal acceleration Gx of the controlled vehicle is controlled by PGVC and ACC system. During driving on the straight road (FIG. 1, section A), the ego-vehicle (controlled vehicle) detects the proceeding vehicle and the distance between the ego-vehicle and the proceeding-vehicle decreases because of the difference of the speed (ego-vehicle is faster than the proceeding vehicle). However, actual-distance is still sufficiently larger than the target-distance and the ACC does not decelerate the ego-vehicle. After the proceeding vehicle starts turning the curve, the sensors of the ego-vehicle have lost the proceeding vehicle (FIG. 1, section B). During this period, PGVC decelerates the vehicle using the curvature information of the driving course (FIG. 1, section C). At the end of cornering, the ego-vehicle detects the proceeding vehicle again and the actual-distance is smaller than target-distance (FIG. 1, section D). Therefore ACC suddenly starts decelerating the vehicle (FIG. 1, section E). This causes discomfort for the driver of the ego-vehicle.

In this figure, the ego-vehicle may have lost the proceeding vehicle because of the limitation of obstacle detection device performance. However, even though the ego-vehicle keeps detecting the proceeding vehicle, ACC would decelerate the vehicle based on the distance between ego-vehicle and proceeding vehicle during cornering. This deceleration is controlled independently of longitudinal acceleration control for cornering and longitudinal acceleration does not change smoothly during cornering. This embodiment is proposed to solve this issue and provides the smooth longitudinal acceleration control for cornering with the proceeding vehicle.

In the below, first, the longitudinal-acceleration control for cornering is described. In order to extend the function of ACC to use in winding road driving, exemplarily, an additional longitudinal-acceleration control algorithm according to GVC or PGVC is proposed, using curvature information.

As the longitudinal-acceleration control based on a lateral motion, longitudinal-acceleration using lateral jerk called "G-Vectoring Control" (GVC) is available. As a fundamental equation defining GVC, the following equation can be used:

$$G_{xt\_GVC} = -sgn(G_y \cdot \dot{G}_y) \frac{C_{xy}}{1+Ts} |\dot{G}_y| \quad (1)$$

where $G_{xt\_GVC}$ is a longitudinal-acceleration command (longitudinal acceleration target value), $C_{xy}$ is a gain factor, and $G_y$ is the lateral acceleration of the controlled vehicle and $\dot{G}_Y$ is the lateral jerk of the controlled vehicle derived as a time derivative of the lateral acceleration of the controlled vehicle. Equation (1) is a basic equation for controlling longitudinal-acceleration in coordination with lateral motion; in other words, it is a very simple control rule: $G_{xt\_GVC}$ is basically determined by the product of $C_{xy}$ and $G_y$ with a time lag of the first order (Ts). According to the results of vehicle tests, it was confirmed that Equation (1) can imitate part of the coordinate-control strategy of an expert driver.

Specifically, based on sensor input by a sensor A or sensor system, which is configured to directly input a regularly or periodically determined or even continuously monitored lateral acceleration $G_Y$ in the pitch axis direction of a vehicle to a control unit (controller) or indirectly provide sensor information on the basis of which the lateral acceleration $G_Y$ can be estimated, a longitudinal acceleration control target value $G_{xt\_GVC}$ is determined, and output to one or more actuators B for vehicle acceleration/deceleration according to the longitudinal acceleration control target value $G_{xt\_GVC}$ output from the control unit.

The sensor A or sensor system may comprise acceleration sensitive sensors such as e.g. motion sensors, accelerometers and/or yaw-rate, pitch-rate and/or roll-rate sensitive gyro-sensors. In addition, or alternative, the sensor A may comprise a steering wheel (or driving wheel) angular sensor sensitive to a steering wheel angle (or driving wheel angle) and a lateral acceleration may be calculated on the basis of vehicle speed and the determined steering wheel angle (or driving wheel angle), and/or it may be estimated on the basis of pitch, roll and/or yaw rates determined by a gyro-sensor.

Based on the input lateral acceleration Gy, a derivative of the lateral acceleration $G_Y$ with respect to time is derived or calculated, referred to as lateral jerk $\dot{G}_Y$, and based on the lateral acceleration Gr and the lateral jerk $\dot{G}_Y$, the longitudinal acceleration target control value $G_{xt\_GVC}$ is calculated according to the equation (1) above.

Here, $C_{xy}$ and T are auxiliary control parameters that can be pre-defined and stored in a memory unit of the control unit 1. $C_{xy}$ is referred to as a "gain factor" (a dimensionless parameter), and the longitudinal acceleration target control value $G_{xt\_GVC}$ is directly proportional to the gain factor $C_{xy}$ and the absolute value of the lateral jerk $\dot{G}_Y$. The longitudinal acceleration target control value $G_{xt\_GVC}$ increases with increased gain factor $C_{xy}$ and decreases with decreased gain factor $C_{xy}$. Another control parameter may be included such as T which is referred to as a "time constant" or "time factor" (a dimensionless parameter). Here, the longitudinal acceleration target control value $G_{xt\_GVC}$ increases with decreased time factor T and decreases with increased time factor T.

According to equation (1) above, the sign of the longitudinal acceleration target control value $G_{xt\_GVC}$ is opposite to the sign of the product of the lateral acceleration $G_Y$ and the lateral jerk $\dot{G}_Y$.

Here, the lateral acceleration $G_Y$ may discriminate between left and right lateral direction by being negative for left (or right) sided lateral acceleration and correspondingly being positive for right (or left) sided lateral acceleration. On the other hand, lateral acceleration $G_Y$ may also only refer to an absolute value of lateral acceleration, however, then the lateral jerk $\dot{G}_Y$ needs to refer to the derivative of the absolute value of lateral acceleration with respect to time.

Figure 2:
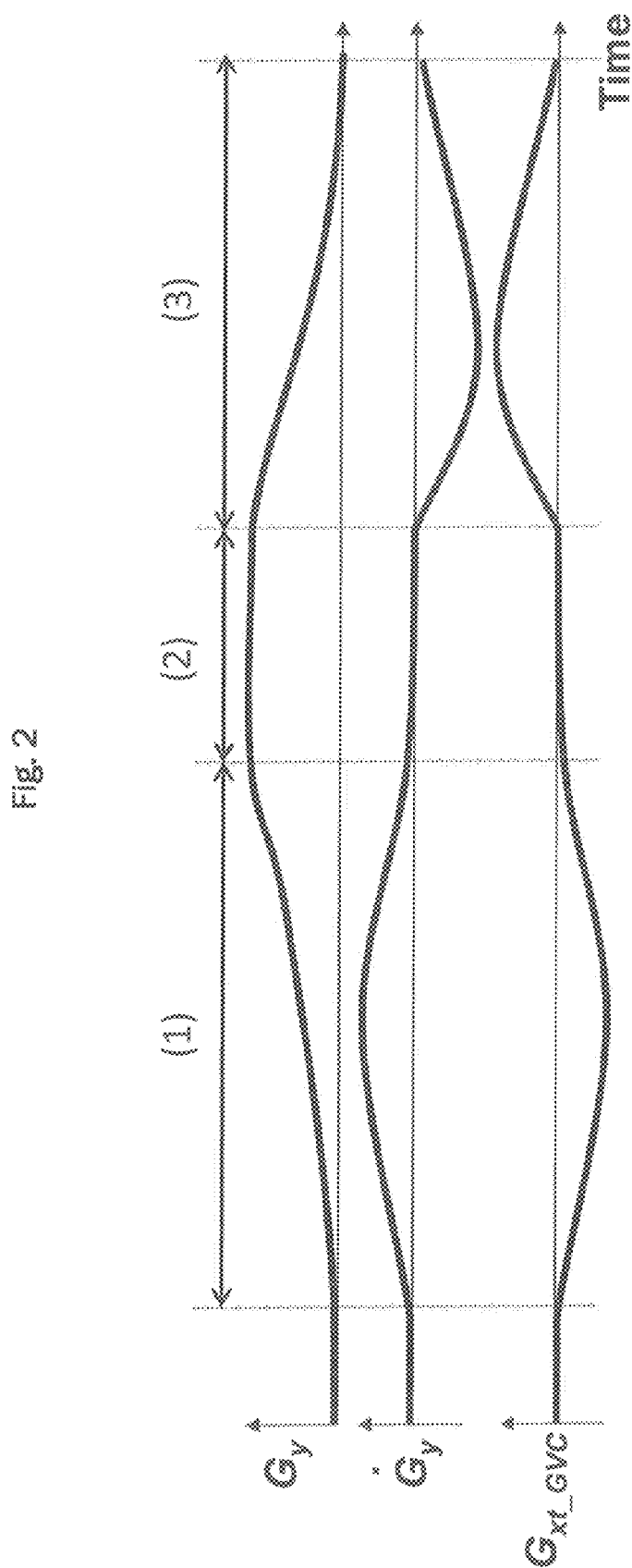
FIG. 2 exemplarily shows a relation between lateral acceleration Gy, lateral jerk $\dot{G}_Y$ and a longitudinal acceleration target value $G_{xt\_GVC}$ determined according to GVC.

FIG. 2 exemplarily illustrates a relation between lateral acceleration $G_Y$, lateral jerk $\dot{G}_Y$ and longitudinal acceleration Gx controlled based on lateral acceleration $G_Y$ and jerk $\dot{G}_Y$ as a function of time, when the longitudinal acceleration Gx is controlled according to the longitudinal acceleration target control value $G_{xt\_GVC}$ as described above. FIG. 2 exemplarily shows the relation between lateral acceleration ($G_y$), lateral jerk ($\dot{G}_Y$) and longitudinal acceleration command of G-Vectoring Control (GVC) ($G_{xt\_GVC}$). When the vehicle starts turning a corner, it starts braking simultaneously as the lateral jerk increases (FIG. 2 (1)). After that, the braking stops during steady-state cornering (FIG. 2 (2)), because the lateral jerk becomes zero. The vehicle begins to accelerate when it begins to return to straight-ahead driving (FIG. 2 (3)).

Specifically, when a vehicle is entering a curve for cornering and the driver moves the steering wheel so that the vehicle turns about the yaw axis, lateral acceleration $G_Y$ (which is zero on a straight road independent of whether the vehicle is accelerating, decelerating or moving at a constant speed) will start to increase from zero, see period between times $t_1$ and $t_2$ in FIG. 2.

In an intermediate period between times $t_2$ and $t_3$ in FIG. 2, lateral acceleration will GY reach a maximum value and may stay approximately constant until it decreases again down to zero in a last cornering period between times $t_3$ and $t_4$ in FIG. 2 when leaving the curve at the curve exit.

Here, depending on the topology of the curve, the time period between times $t_2$ and $t_3$ may be very short or not even exist. In the later case, the lateral acceleration $G_Y$ may increase from zero to a maximum value and thereafter directly decrease again down to zero when leaving the curve.

As shown in FIG. 2, the lateral jerk $\dot{G}_Y$ will increase to a maximum value during this cornering scenario and decrease again down to zero between times $t_1$ and $t_2$. In the intermediate time period between times $t_2$ and $t_3$, where the lateral acceleration $G_Y$ does not vary significantly, the lateral jerk $\dot{G}_Y$ remains zero, and in the last time period between times $t_3$ and $t_4$, lateral jerk $\dot{G}_Y$ will decrease from zero to a minimum during this cornering scenario value and increase again up to zero.

The longitudinal acceleration target control value $G_{xt\_GVC}$ as described above will behave similarly to the absolute value of the lateral jerk $\dot{G}_Y$ because being directly proportional to the absolute value of the lateral jerk $\dot{G}_Y$ but the sign is the opposite sign of the product of lateral acceleration and jerk.

Consequently, directly after entering the curve and beginning the cornering in the first period between times $t_1$ and $t_2$, the longitudinal acceleration target control value $G_{xt\_GVC}$ will decrease down from zero to a minimum value during this cornering scenario and increase again to zero. In this period, the longitudinal acceleration target control value $G_{xt\_GVC}$ is negative and thus corresponds to a negative acceleration or deceleration (braking) of the vehicle in the first phase of cornering. Accordingly, during the whole period between times $t_1$ and $t_2$, vehicle speed will be decreased (deceleration or braking control).

In the intermediate period between times $t_2$ and $t_3$, the longitudinal acceleration target control value $G_{xt\_GVC}$ will remain approximately zero as long as the lateral jerk $\dot{G}_Y$ remains approximately zero, i.e. the vehicle will move by an approximately constant speed through the curve during the cornering during the period between times $t_2$ and $t_3$.

Finally, in the last stage of cornering before leaving the curve, during the period between times $t_3$ and $t_4$, the longitudinal acceleration target control value $G_{xt\_GVC}$ will increase up from zero to a maximum value during this cornering scenario and decrease again to zero. In this period, the longitudinal acceleration target control value $G_{xt\_GVC}$ is positive and thus corresponds to a positive acceleration of the vehicle in the final phase of cornering. Accordingly, during the whole period between times $t_3$ and $t_4$, vehicle speed will be increased (acceleration control).

Figure 3:
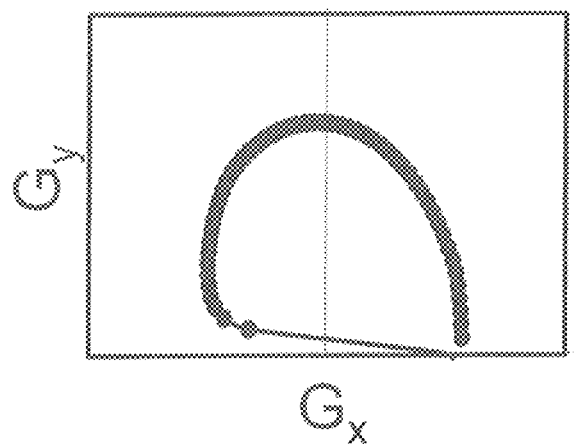
FIG. 3 exemplarily shows a g-g-diagram.

FIG. 3 exemplarily shows a g-g-diagram for the lateral and longitudinal accelerations $G_Y$ and $G_X$ during cornering of the vehicle under control of longitudinal acceleration Gx based on lateral acceleration Gy and jerk $\dot{G}_Y$ according to the longitudinal acceleration target control value $G_{xt\_GVC}$. Here, the horizontal axis denotes the longitudinal acceleration Gx (negative values on the left and positive values on the right), and the vertical axis denotes positive values of the lateral acceleration $G_Y$.

According to the relations as explained with reference to FIG. 2, the g-g-diagram of FIG. 3 will be run through in a clockwise direction starting at the origin where $G_X=G_Y=0$ before entering the curve prior to cornering. As soon as the vehicle starts cornering, the lateral acceleration $G_Y$ will increase, resulting in a negative longitudinal acceleration $G_X$ until the lateral acceleration $G_Y$ reaches a maximum value, resulting in the longitudinal acceleration $G_X$ being zero, whereafter the lateral acceleration $G_Y$ will decrease again down to zero in the final stage of cornering, resulting in a positive longitudinal acceleration Gx until the lateral acceleration $G_Y$ reaches zero again at the exit of the curve.

Summarizing the above, in the control of the longitudinal acceleration Gx of the vehicle according to the longitudinal acceleration target control value $G_{xt\_GVC}$, when the vehicle starts entering a corner, the vehicle will automatically brake (or decelerate) simultaneously as the lateral jerk $\dot{G}_Y$ increases (see the period between times $t_1$ and $t_2$ in FIG. 2, left side of FIG. 3), and thereafter the vehicle may remain in a steady-state cornering in which no longitudinal acceleration or deceleration is performed (i.e. the vehicle stops braking without accelerating again) in the period between times $t_2$ and $t_3$ in FIG. 2 because the lateral jerk $\dot{G}_Y$ becomes zero. Finally, the vehicle begins to accelerate again in the final stage of cornering when the vehicle begins to return to straight-ahead driving (see the period between times $t_3$ and $t_4$ in FIG. 2, right side of FIG. 3).

In addition to GVC as discussed above, as another longitudinal-acceleration control based on curvature, longitudinal-acceleration using longitudinal-acceleration model called "Preview G-Vectoring Control" (PGVC) is also available.

Figure 4:
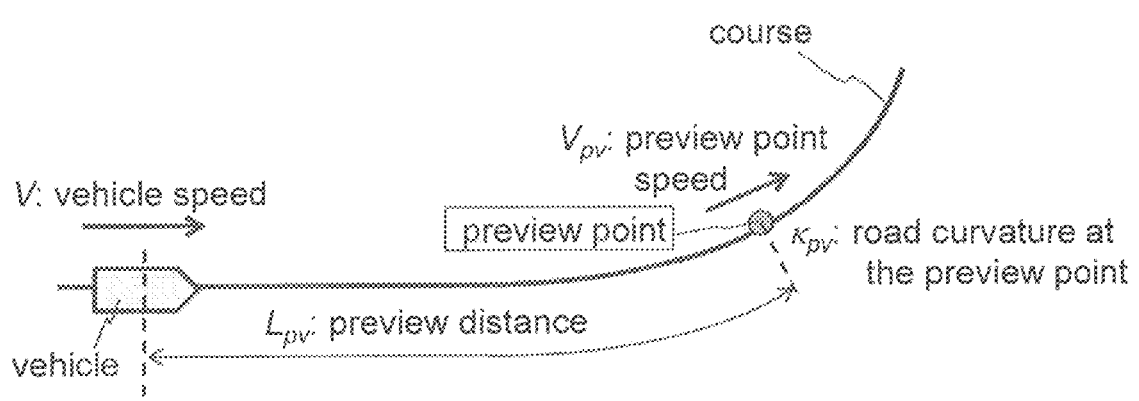
FIG. 4 exemplarily illustrates a longitudinal-acceleration model based on a general look-ahead concept for PGVC.

FIG. 4 shows the longitudinal-acceleration model based on a general look-ahead concept using a preview point (e.g. a point on the course ahead of the controlled vehicle by distance Lpv): the speed of the controlled vehicle at this point (Vpv), vehicle speed (V), and road-curvature at the preview point (κ pv). When the vehicle is traveling at constant speed at the preview point, lateral-acceleration generated on the vehicle (Gy_pv) is given in Equation (2) as follows.

$$G_{y\_pv} = \kappa_{pv} \cdot V^2 \quad (2)$$

By assuming that acceleration/deceleration is executed with an equivalent algorithm to longitudinal-acceleration control in response to lateral motion of the vehicle (i.e., GVC), it is possible to control longitudinal-acceleration before lateral motion of the vehicle actually occurs. With GVC, on the basis of the above-mentioned assumption, longitudinal-accelerations corresponding to Gy_pv are calculated by using Gy_pv in place of the lateral jerk ($\dot{G}_Y$) given by Equation (1). In this manner, a longitudinal-acceleration command value (Gxt_pv) related to the lateral motion of the vehicle that will be generated (rather than lateral motion of the vehicle that was generated) is given. Under the some assumptions (κ pv is positive, V is constant), Gxt_pv is given by Equation (3) from Equations (1), (2) using gain (Cxy_pv) and time constant (Tpv).

$$G_{xt\_pv} = -\frac{C_{xy\_pv}}{1+T_{pv}s} \cdot k_{pv} \cdot V^2 \quad (3)$$

Figure 5:
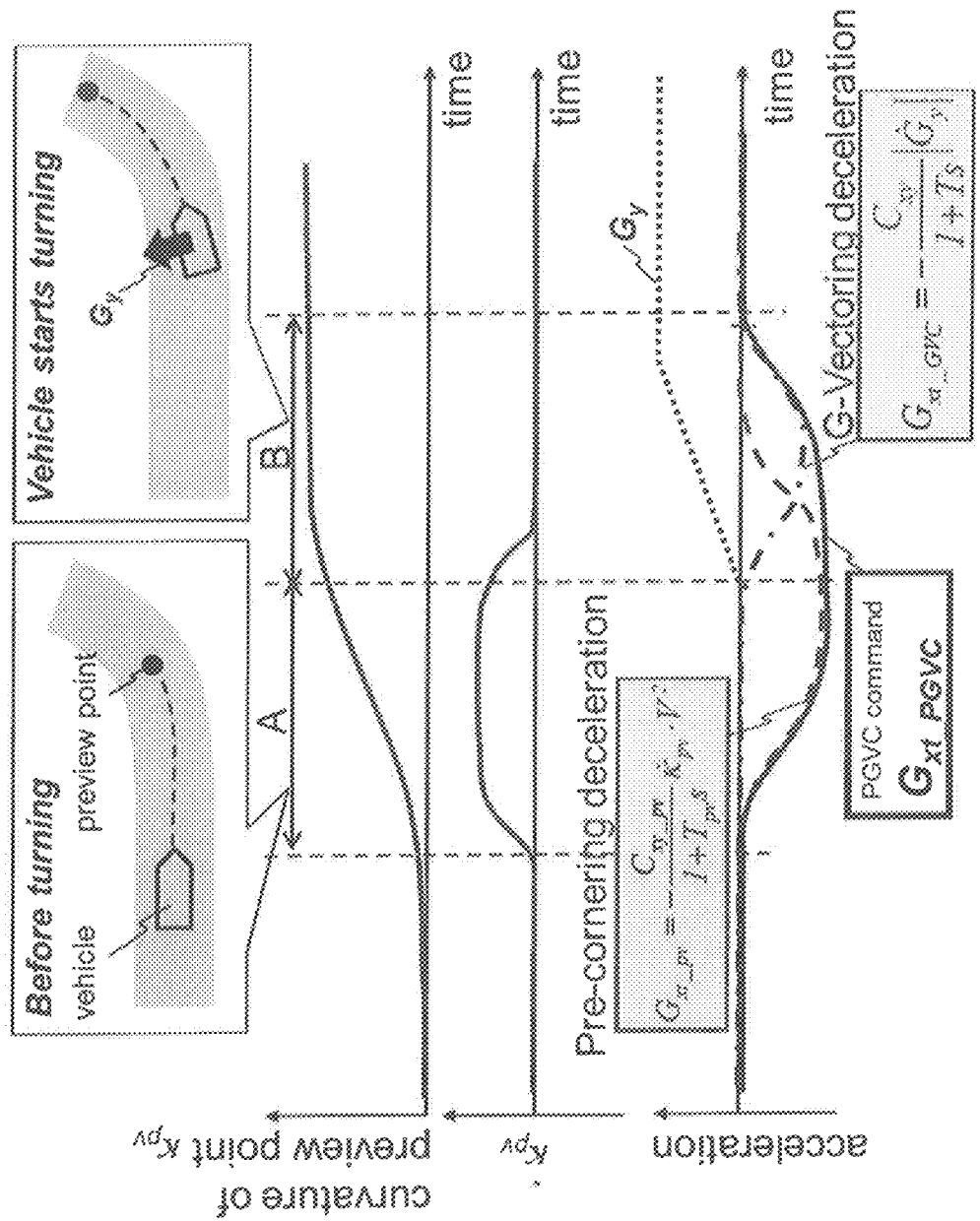
FIG. 5 exemplarily shows an illustration of the deceleration control by Preview G-Vectoring Control (PGVC).
Figure 6:
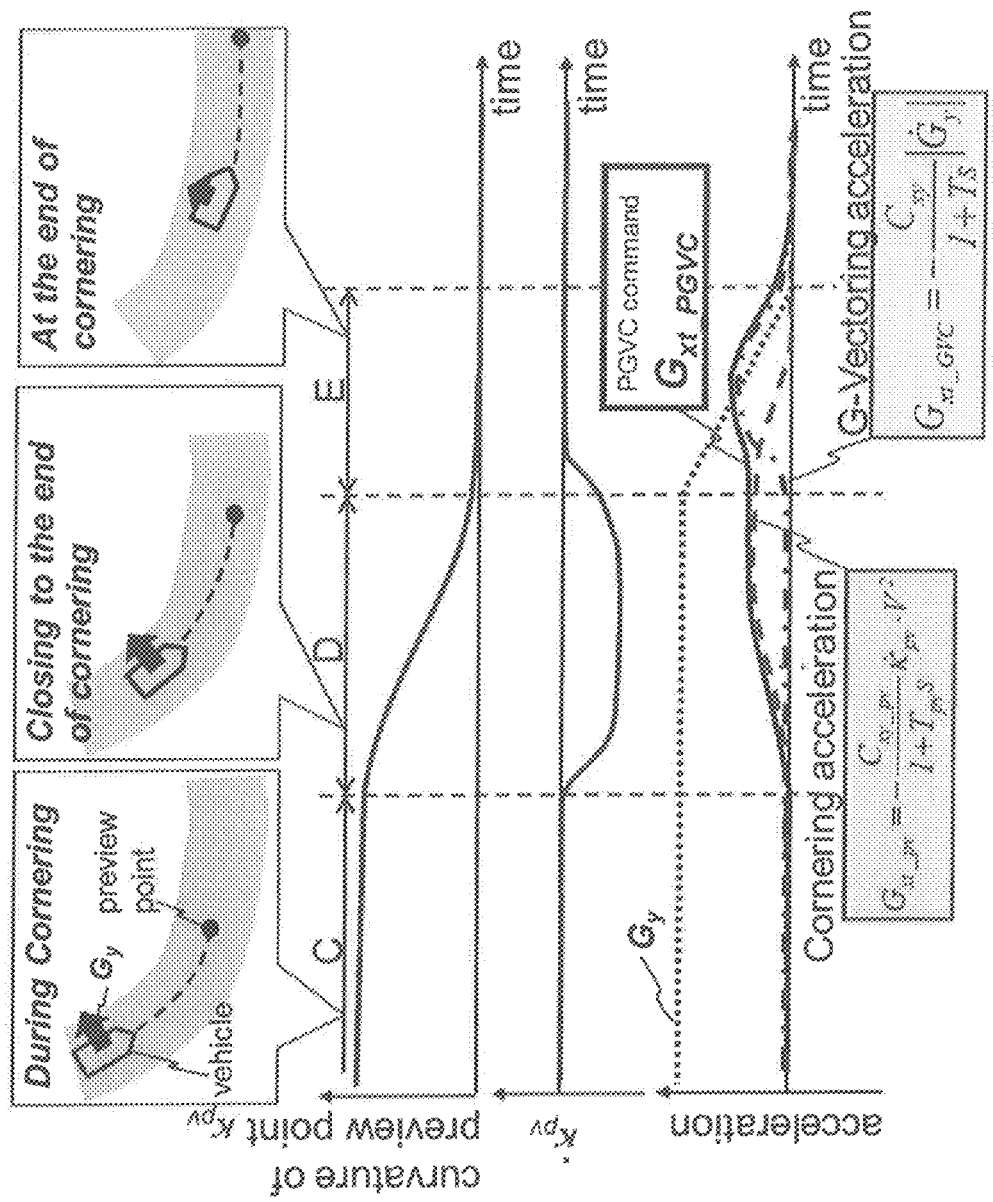
FIG. 6 exemplarily shows exemplarily shows an illustration of the acceleration control by Preview G-Vectoring Control (PGVC).

The longitudinal control of PGVC (Gxt_PGVC) is calculated based on the G-Vectoring Control command (Gxt_GVC) described by Equation (1) and longitudinal-acceleration for cornering (Gxt_pv) described by Equation (3). FIG. 5 and FIG. 6 show the typical cornering scenario with deceleration/acceleration control by PGVC.

FIG. 5 exemplarily shows the first stage of cornering: from closing to the curve to the steady state of cornering. When the vehicle closes to the curve, the curvature of preview point (tc pv) increases before the vehicle starts turning (FIG. 5, section A). In this phase, κ pv increases and Pre-cornering deceleration command (Gxt_pv) is calculated based on κ p (dash line). After the vehicle starts turning (FIG. 5, section B), lateral-acceleration (Gy) starts increasing. In this phase, G-Vectoring deceleration command (Gxt_GVC) is calculated based on lateral jerk information (dash-dot line). The deceleration command by PGVC is calculated by combining Gxt_pv and Gxt_GVC as shown in FIG. 5 (solid line). As the results, PGVC can decelerate the vehicle during the first stage of cornering.

FIG. 6 exemplarily shows the last stage of cornering: from the steady state to the end of the curve. While the curvature of preview point (tc pv) is constant, PGVC gives no acceleration/deceleration (keep the constant speed) (FIG. 6 C). When κ pv starts decreasing and κ pv becomes minus, cornering acceleration command (Gxt_pv) is calculated based on κ p (dash line) (FIG. 6, section D). At the end of cornering, lateral-acceleration (Gy) starts decreasing, and G-Vectoring acceleration command (Gxt_GVC) is calculated based on lateral jerk information (dash-dot line) (FIG. 6, section E). The acceleration command by PGVC can be calculated by combining Gxt_pv and Gxt_GVC as shown in FIG. 6 (solid line). As the result, PGVC can accelerate the vehicle with the decreasing distance from the end of the curve.

Figure 7:
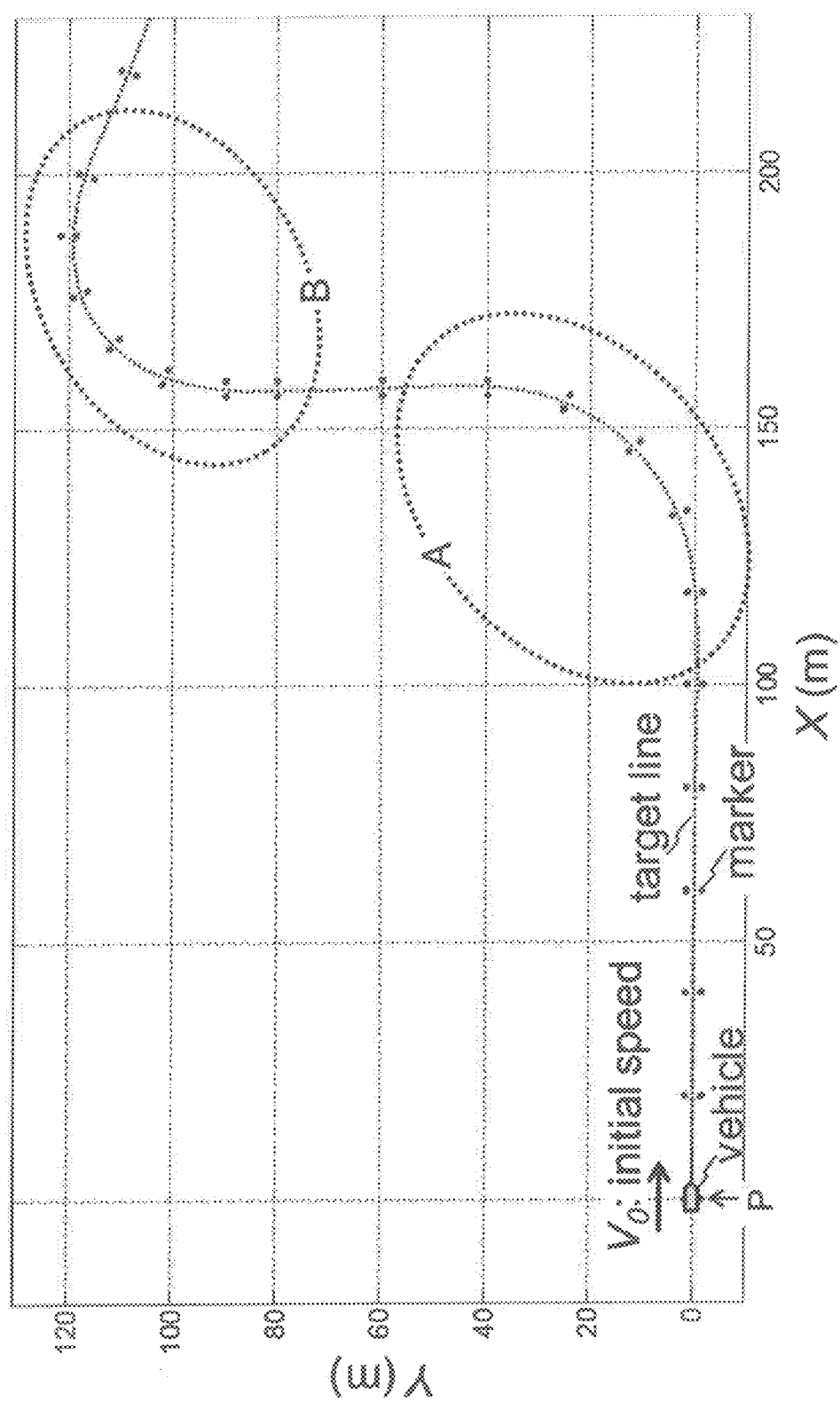
FIG. 7 exemplarily shows an illustration of a two-cornering course layout.

FIG. 7 exemplarily shows the two-cornering course to compare Gxt_PGVC with the driver's acceleration/deceleration behavior.

Figure 8:
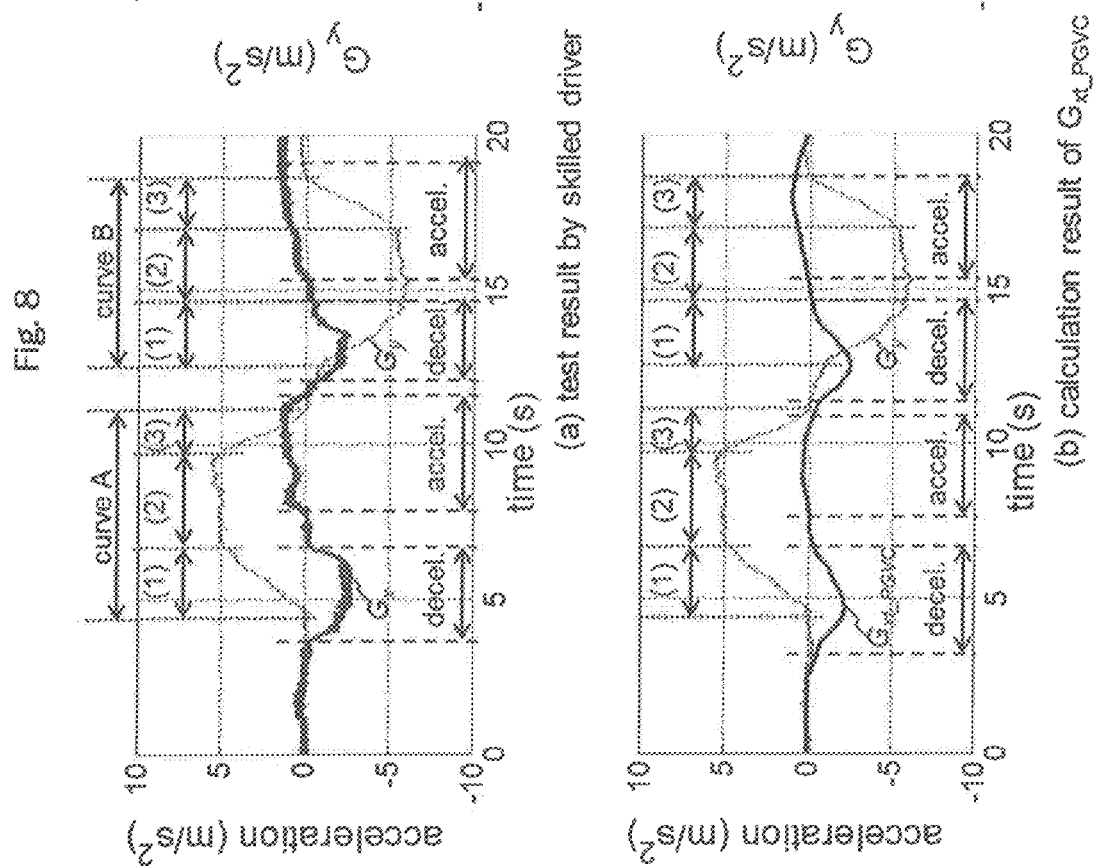
FIG. 8 exemplarily shows a comparison of longitudinal-acceleration caused by skilled driver and calculation result of PGVC command (Gxt_PGVC).

FIG. 8 shows the comparison of longitudinal-acceleration caused by skilled driver (FIG. 8 (a)) and calculation result of PGVC command (Gxt_PGVC) (FIG. 8 (b)) at 80 km/h as initial speed (V0): left side shows the change of longitudinal- and lateral-acceleration (Gx, Gy), and right side shows "g-g" diagram.

In FIG. 8 (b), PGVC command (Gxt_PGVC) is calculated based on Equations (1) and (3) above using the curvature data calculated from target line shown in FIG. 7, measured data of vehicle speed and lateral-acceleration by driving tests. As shown in FIG. 8, lateral-acceleration (Gy), changes to plus for curve A and minus for curve B, and each lateral-acceleration change has three phases: increasing phase (phase (1)), steady state phase (phase (2)) and decreasing phase (phase (3)). The driver controls acceleration/deceleration depends on the lateral-acceleration changes; starts decelerating the vehicle (FIG. 8 "decel.") before the phase (1) starts and finishes it when the phase (1) finishes. After that, the driver starts accelerating (FIG. 8 "accel.") in phase (2), that is, before the phase (3) starts. As shown in FIG. 8 (b), the calculated PGVC command (Gxt_PGVC) has same feature with this driver's acceleration/deceleration. Also "g-g" diagram by Gxt_PGVC (FIG. 8 (b)) shows the same shape with driver's one (FIG. 8 (a)).

Desired acceleration during cornering strongly depends on a driver's taste: some driver likes high-acceleration cornering and some driver wants to turn without excessive acceleration. In response to the difference of the driver's preference, different settings of PGVC will be prepared by changing the PGVC parameters (mainly the gain $C_{xy}$, $C_{xy\text{-}pv}$).

Figure 9:
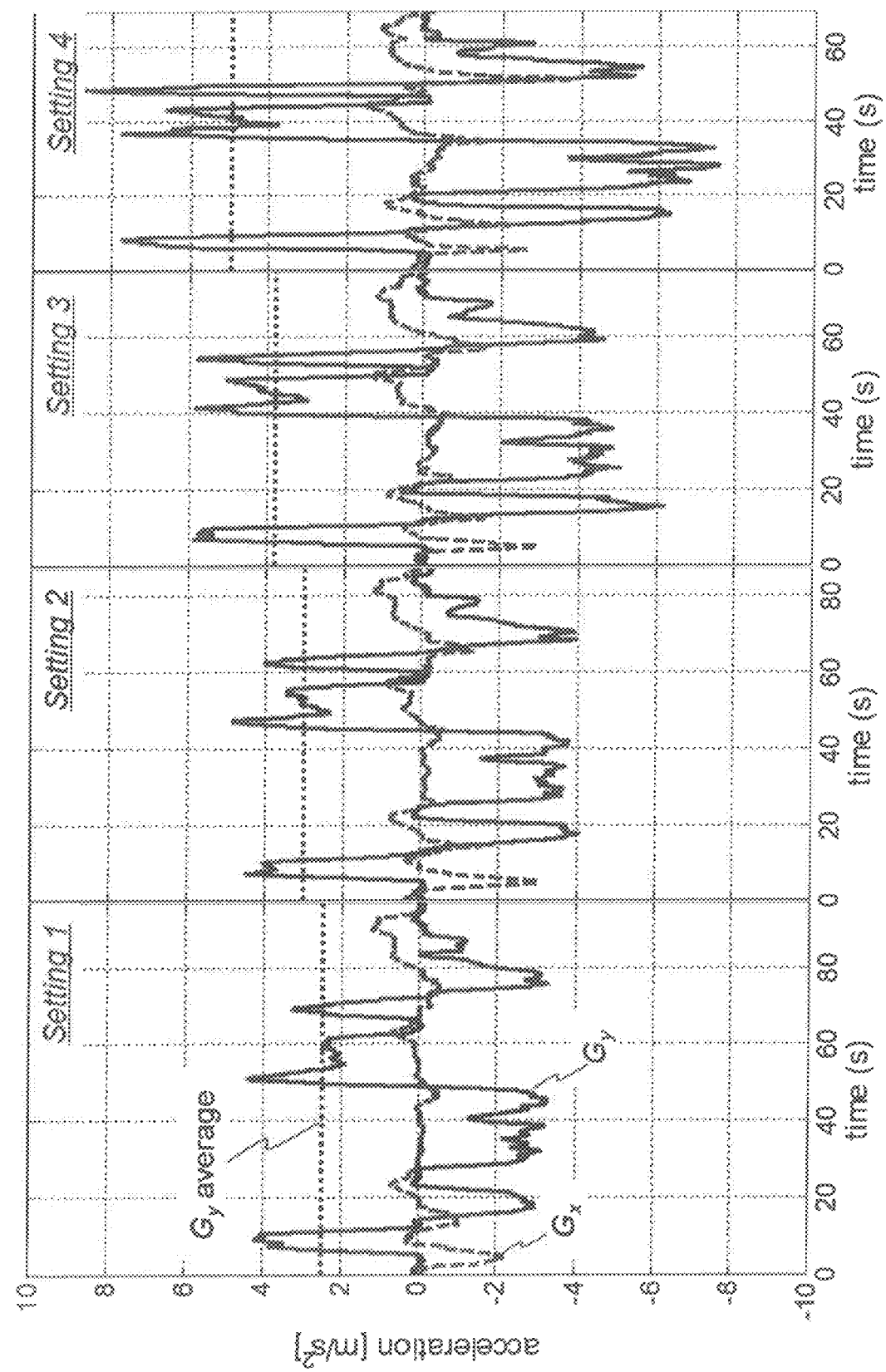
FIG. 9 exemplarily shows an illustration of lateral and longitudinal acceleration with several PGVC setting modes.

FIG. 9 exemplarily shows the lateral and longitudinal acceleration with several PGVC setting (setting 1 to 4). The longitudinal-acceleration (Gx, dash line) by PGVC is adjusted to adapt each setting by PGVC parameters tuning. As shown in FIG. 9 (a), $G_x$ by PGVC can make a difference of lateral-acceleration ($G_y$, solid line) with the settings: the average of $G_y$ (dot line) increases with the setting number increases (1 to 4).

Figure 10:
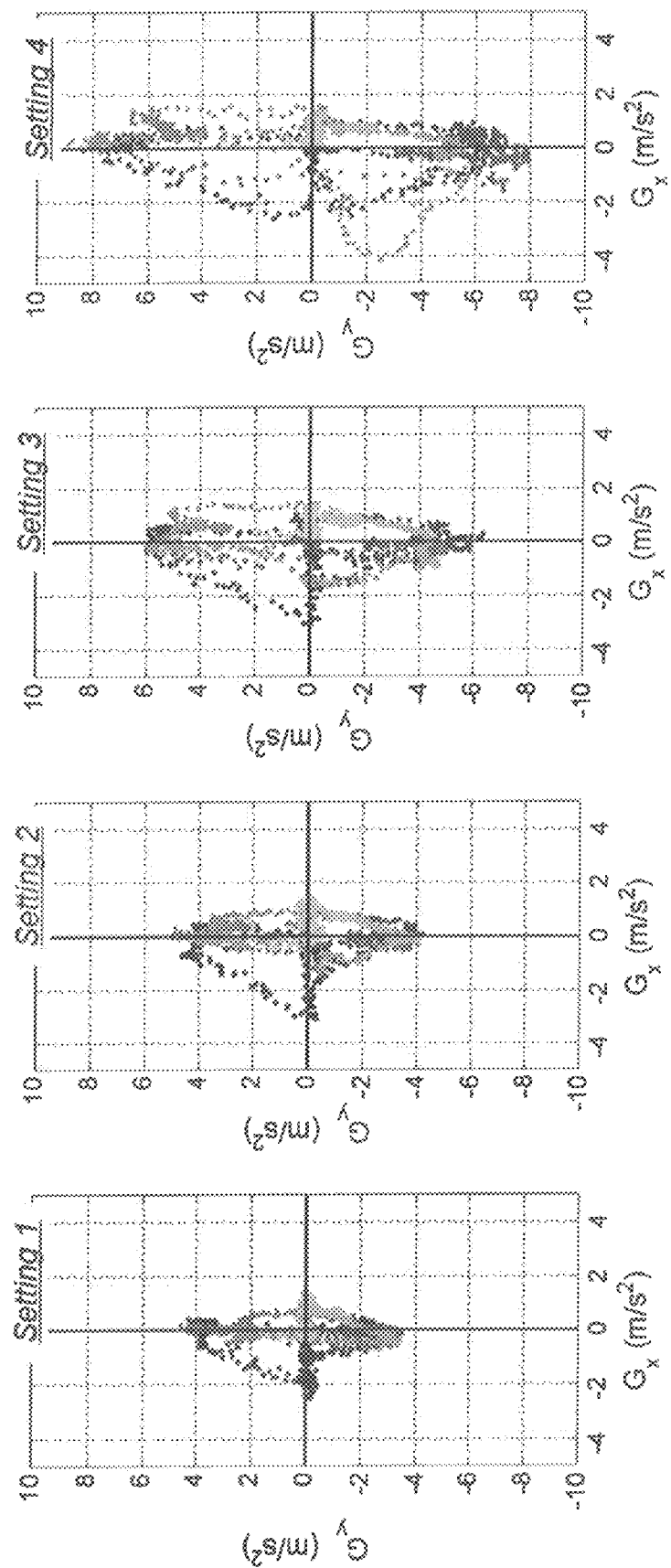
FIG. 10 exemplarily shows g-g-diagrams for the setting modes of FIG. 9.

FIG. 10 exemplarily shows "g-g" diagram with several PGVC setting. This difference also appeared in the "g-g" diagram (See FIG. 9 (b)): The trajectory on the "g-g" diagram becomes wider with the setting number increases. However the relation of $G_x$ and $G_y$ is relatively maintained: the direction of the resultant acceleration seamlessly changes on a "g-g" diagram. This acceleration change on the "g-g" diagram is one of the features of PGVC, which improves the driver's feeling during cornering.

Figure 11:
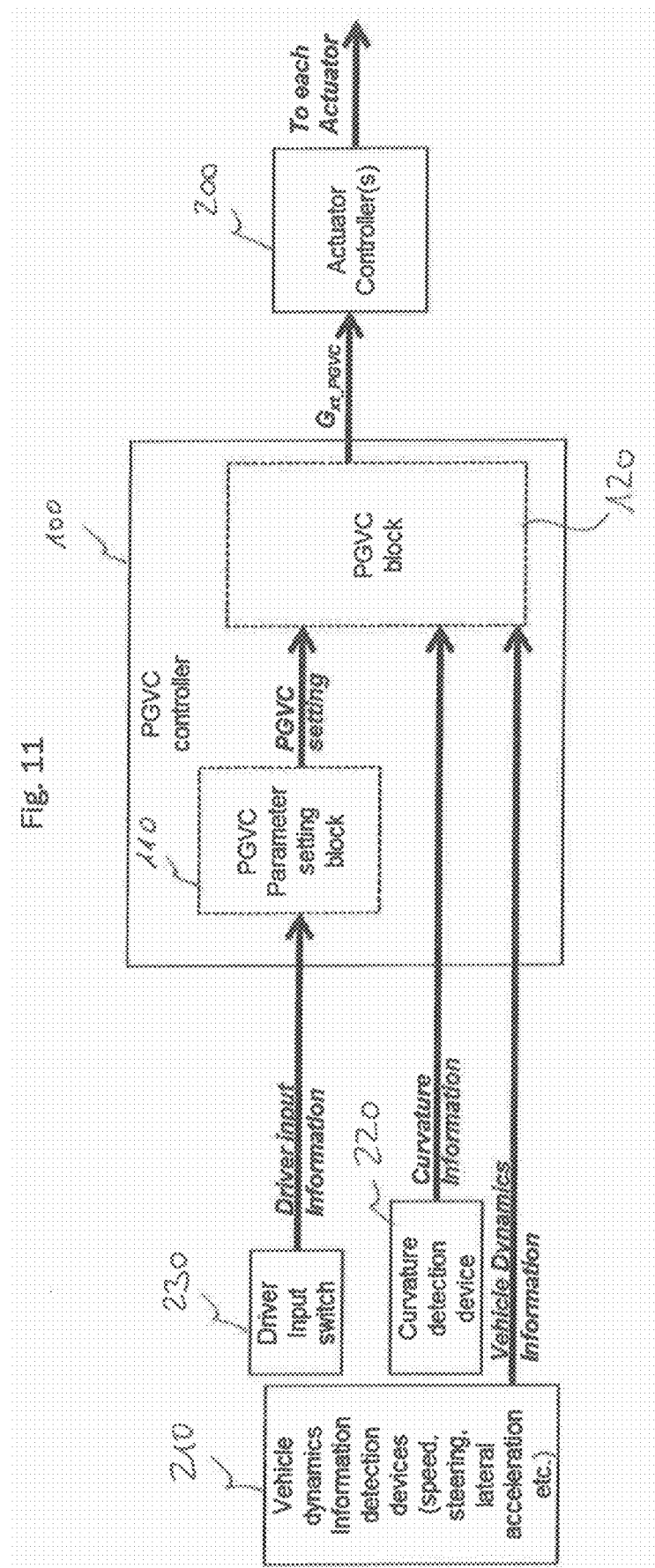
FIG. 11 exemplarily shows a schematic block diagram of a controller system for PGVC.

FIG. 11 exemplarily shows the block diagram of basic PGVC system. In this system, PGVC parameter setting block 110 detects the driver's input to set the PGVC's parameters. These setting parameters are sent to PGVC block 120 and the longitudinal-acceleration command by PGVC ($G_{xt\_PGVC}$) is calculated. $G_{xt\_PGVC}$ is sent to actuator controller(s) 200 and to decelerate/accelerate the vehicle by the actuator(s) 200.

Specifically, a driver input switch 230 may be adapted to allow a user to select parameter settings of the PGVC parameters which can be input as driver input information to the PGVC parameter setting block 110 embodying a setting means. On the other hand, vehicle dynamics information detection devices 210 (such as sensors including speed sensor, accelerometer, gyro-senor, steering wheel angle sensor etc.) may provide information on the vehicle dynamics (vehicle dynamics information) such as vehicle speed, steering wheel angle, lateral and/or longitudinal acceleration acting on the controlled vehicle etc. The vehicle dynamics information is provided to the PGVC block 120 embodying a longitudinal acceleration target value determining means. In addition curvature information (such as map data and/or a curvature at a preview point determined based on map data) is provided from a curvature detection device 220 to the PGVC block 120 embodying the longitudinal acceleration target value determining means.

A PGVC controller 100 (e.g. a longitudinal acceleration control means) comprises the PGVC block 120 and the PGVC parameter setting block 110, and is adapted to output the target control value $G_{xt\_PGVC}$ to actuator controller(s) of the vehicle via an actuator controller 200 (or directly in other embodiments).

Figure 12:
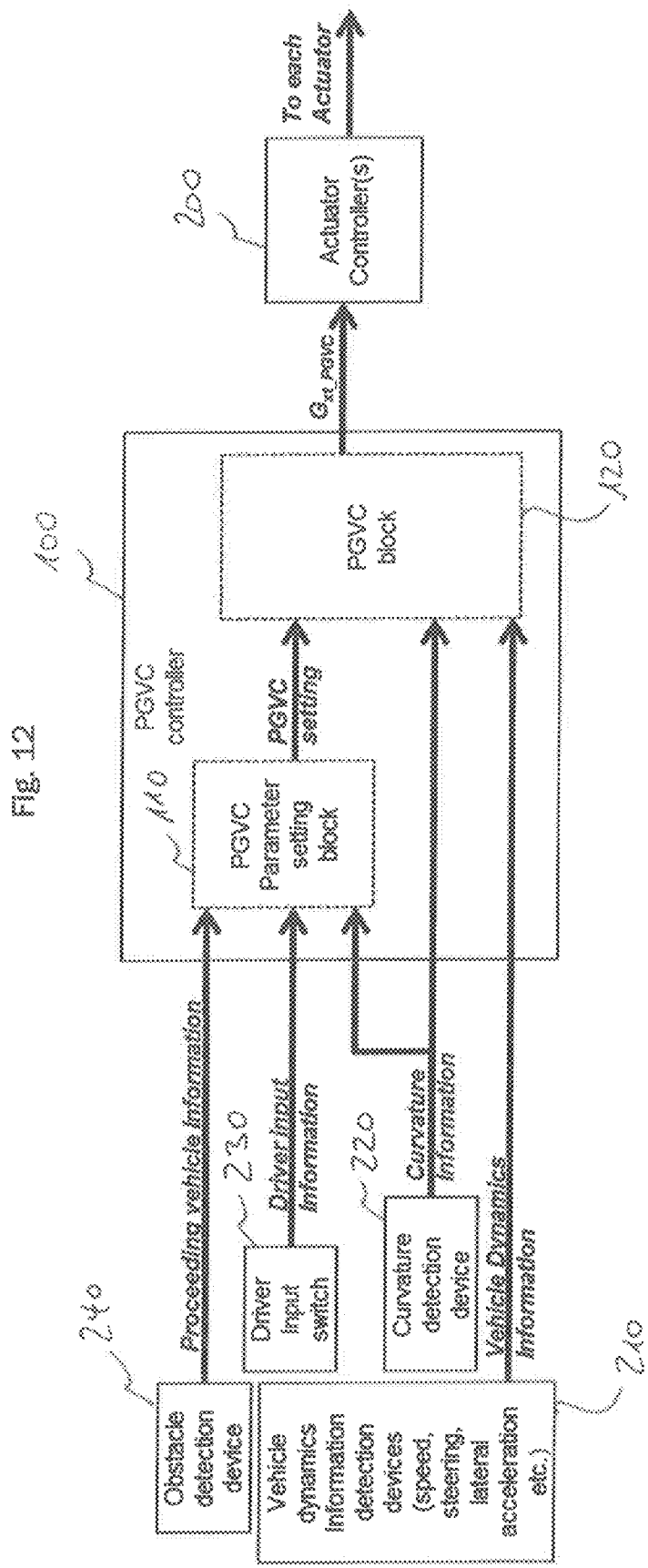
FIG. 12 exemplarily shows a schematic block diagram of a controller system for an advanced PGVC.

FIG. 12 shows the block diagram of advanced PGVC system. In this system, an obstacle detection device 240 is added and the proceeding vehicle information (proceeding vehicle speed, distance from the proceeding vehicle) is sent to PGVC controller 100. In the PGVC controller 100, the PGVC Parameter setting block 110 sets the parameters for PGVC based on driver's input, curvature information of the driving course and the proceeding vehicle information received from the obstacle detection device 240. The obstacle detection device 240 may receive data from the proceeding vehicle (and/or indirectly from a data center) indicating a position and/or speed of the proceeding vehicle, and/or lateral acceleration, and/or longitudinal acceleration acting on the proceeding vehicle, e.g. via a communication protocol. Alternatively or in addition, the obstacle detection device 240 may comprise sensors (such as camera, radar, sonar etc.) for determining a relative position and/or speed of the proceeding vehicle.

Using these information, PGVC parameters are set to decelerate/accelerate the vehicle for cornering as the proceeding vehicle doing. For example, if the proceeding vehicle drives the curve slowly to reduce the lateral acceleration during cornering, ego vehicle also drives the curve slowly, even though the driver selected high-acceleration cornering setting like setting 4 in FIG. 9. As the result, ego vehicle keeps the distance from the proceeding vehicle during cornering, and deceleration control by ACC to keep the distance would not be activated; longitudinal acceleration during cornering would be smooth.

Figure 13:
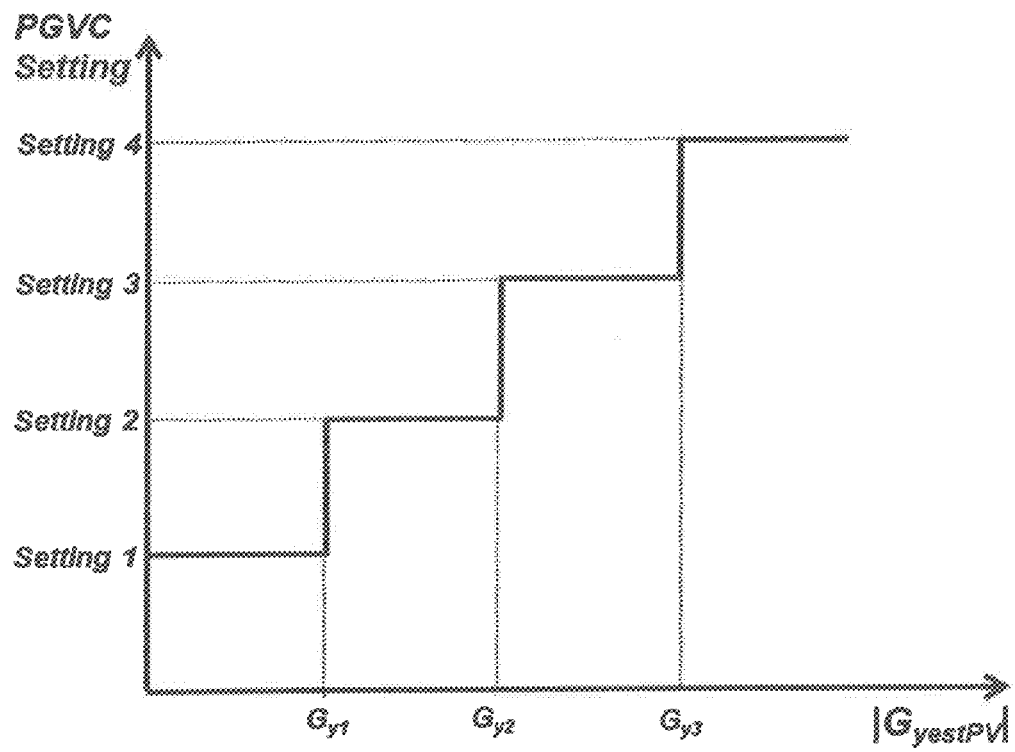
FIG. 13 exemplarily shows a relation between PGVC settings in several setting modes as a function of the absolute value of GyestPV.

FIG. 13 exemplarily shows one example to set the PGVC parameters. In this case, PGVC has several pre-set setting modes (setting 1 to 4), and the parameters are set to increase the average/maximum lateral acceleration during cornering with the setting number increases (1 to 4), as shown in FIG. 9. The estimated lateral acceleration acting on the proceeding vehicle ($G_{yestPV}$) is calculated by the proceeding vehicle speed and curvature information. PGVC setting is selected depend on the absolute value of $G_{yestPV}$ at the beginning (here, $G_{y1} < G_{y2} < G_{y3}$). This selected value is compared with the selected setting by driver, and smaller setting number is selected as the PGVC setting.

Figure 14A:
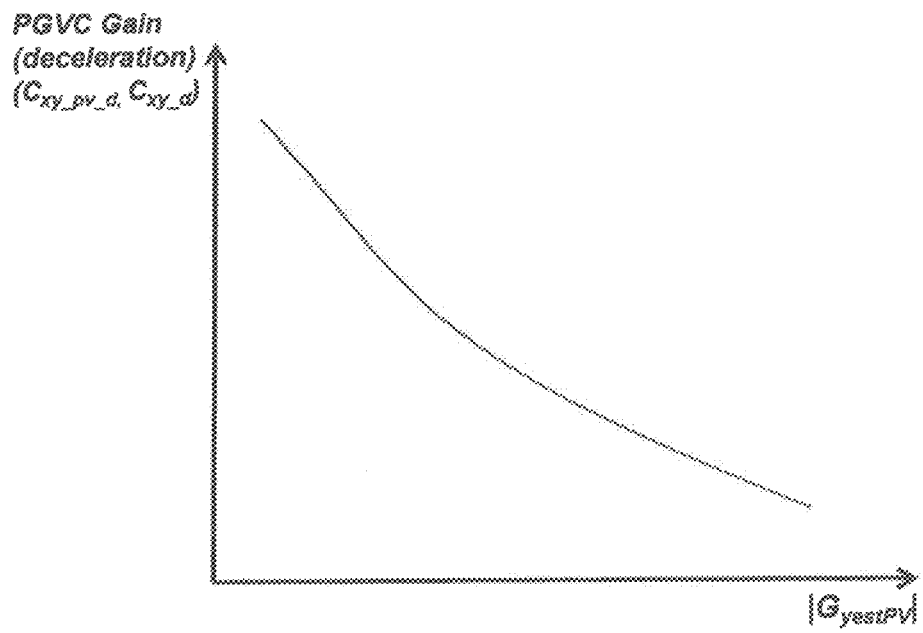
FIG. 14 exemplarily shows a relation between PGVC gain factors and the absolute value of GyestPV for deceleration control (FIG. 14A) and for acceleration control (FIG. 14B).
Figure 14B:
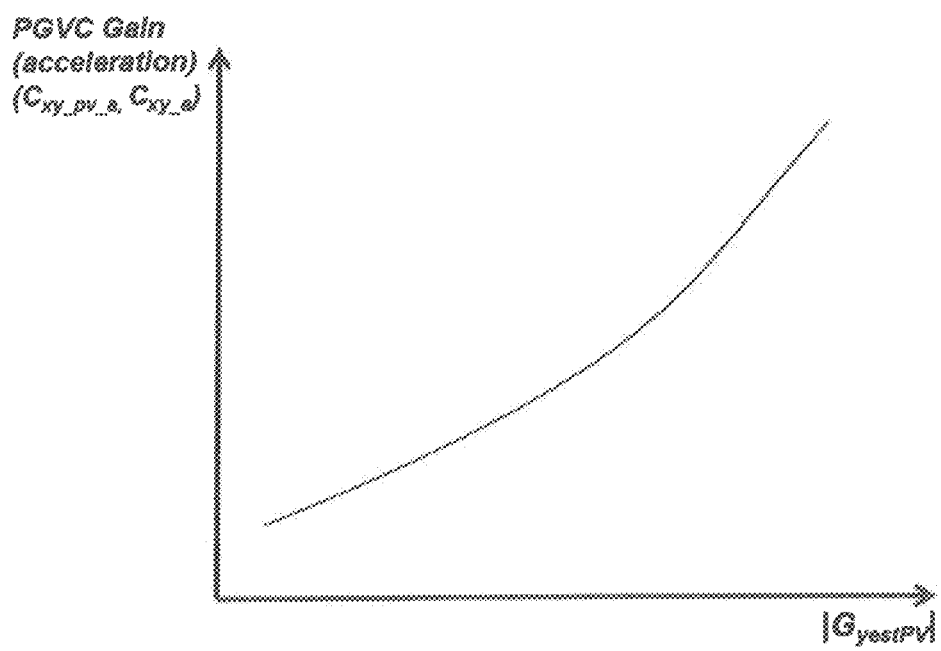

FIG. 14 exemplarily shows another example to set the PGVC parameters. In this case, PGVC gain $C_{xy\_d}$, $C_{xy\_pv\_d}$ for deceleration control, $C_{xy\_a}$, $C_{xy\_pv\_a}$ for deceleration control), which is the Parameters of PGVC, directly changes with the absolute value of $G_{yestPV}$: PGVC gains for deceleration control decreases with the absolute value of $G_{yestPV}$ increasing and PGVC gains for acceleration control increases with the absolute value of $G_{yestPV}$ increasing. PGVC gain ($C_{xy\_d}$, $C_{xy\_pv\_d}$, $C_{xy\_a}$, $C_{xy\_pv\_a}$) is calculated at the beginning, and compared with the selected gain by driver. Bigger value is selected as PGVC gain for deceleration control and smaller value is selected as PGVC gain for acceleration control.

Figure 15:
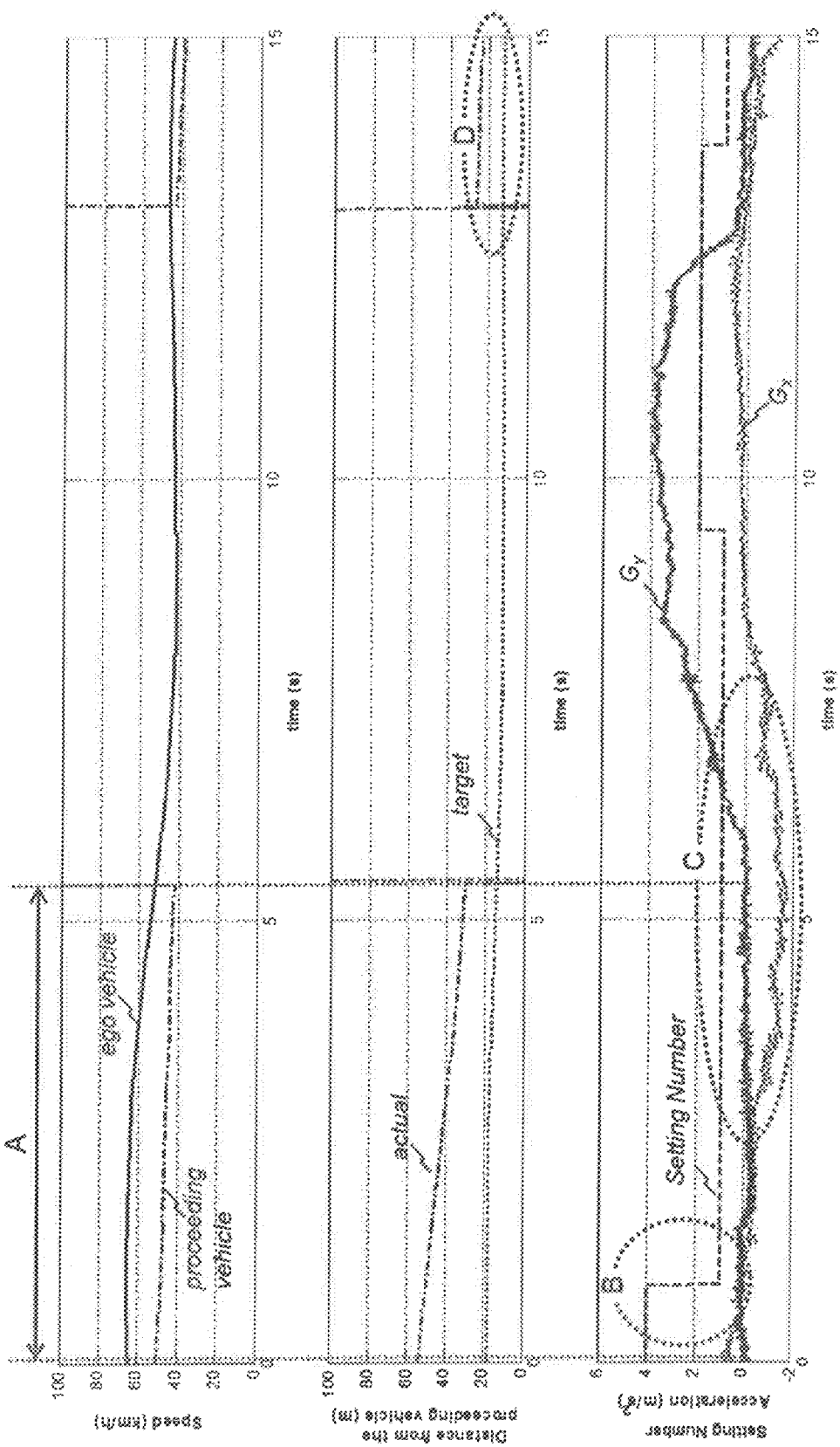
FIG. 15 exemplarily shows a time diagram of the speed of the ego vehicle and the proceeding vehicle, the distance from the proceeding vehicle, the longitudinal-acceleration ($G_x$) and lateral-acceleration ($G_y$) during driving on a curve with a proceeding vehicle. $G_x$ is controlled by advanced PGVC and ACC system.

FIG. 15 exemplarily shows a speed of the ego vehicle (solid line) and the proceeding vehicle (dash-dot line), distance from the proceeding vehicle (dash-dot line) and target distance (dot line), longitudinal-acceleration ($G_x$) and lateral-acceleration ($G_y$) during driving on a curve with a proceeding vehicle. Gx is controlled by advanced PGVC with four difference setting shown FIG. 9 and ACC system.

In this case, driver selects the setting 4 at the beginning. During the driving on the straight road (FIG. 15, section A), the ego-vehicle detects the proceeding vehicle and the distance between ego-vehicle and proceeding-vehicle decreases because of the difference of the speed (ego-vehicle is faster than the proceeding vehicle). However, the actual-distance is still sufficiently larger than the target-distance and the ACC does not decelerate the ego-vehicle. During this period, PGVC setting is changed from Setting 4 to Setting 1 (FIG. 15, section B) and the deceleration start timing of PGVC becomes earlier than FIG. 1 case (FIG. 15, section C). As the results, the ego vehicle can conveniently keep the distance from the proceeding vehicle (FIG. 15, section D), and deceleration control by ACC is not activated; also, the longitudinal acceleration changes smoothly during cornering.

Figure 16:
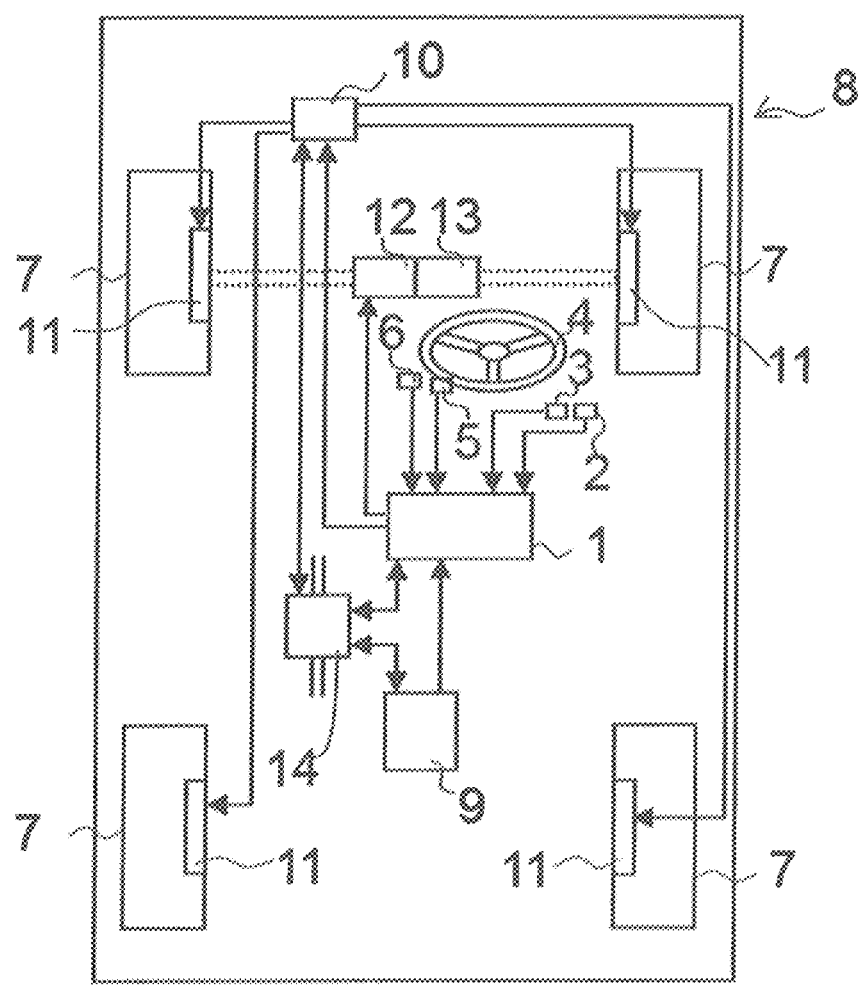
FIG. 16 exemplarily shows a control system outline to control the longitudinal acceleration by ACC combined with PGVC.

FIG. 16 exemplarily shows the system outline to control the longitudinal acceleration by ACC combined with PGVC. The control system comprises a longitudinal acceleration control unit 1 (e.g. realized as shown in FIG. 11 or FIG. 12), an accelerometer 2, a gyro-sensor 3, a steering wheel 4, a steering wheel angle sensor 5, an obstacle detect device 6 (e.g. for detecting a distance to and/or speed of a proceeding vehicle), a tire 7, a vehicle 8, a curve-detect device 9, a brake control unit 10, a brake actuator 11, a drive-torque control unit 12, a drive-torque actuator 13 and a communication bus line 14.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. Method for performing driving assistance for a controlled vehicle moving in a longitudinal direction on a road, comprising:
   determining a longitudinal acceleration target value ($G_{XT\_GVC}$) on the basis of a lateral acceleration ($G_Y$; $G_{Y\_PV}$) of the controlled vehicle and one or more setting parameters ($C_{XY}$; $T_S$; $C_{XY\_PV}$; $T_{S\_PV}$),
   controlling a longitudinal acceleration ($G_X$) of the controlled vehicle on the basis of the calculated longitudinal acceleration target value ($G_{XT\_PGVC}$),
   estimating or determining a driving characteristics of a proceeding vehicle which moves in the longitudinal direction on the road ahead of the controlled vehicle, and
   setting the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated or predicted driving characteristics of the proceeding vehicle.

2. Method according to claim 1, wherein
   a driving characteristics of the proceeding vehicle is estimated or determined on the basis of information received from the proceeding vehicle or from a data center which has information of the proceeding vehicle, using a communication protocol between the controlled vehicle and the proceeding vehicle or the data center,
   a driving characteristics of the proceeding vehicle is estimated or determined on the basis of information detected by sensors of the controlled vehicle,
   a driving characteristics of the proceeding vehicle is estimated or determined based on the longitudinal acceleration and/or lateral acceleration acting on the proceeding vehicle, and/or
   a driving characteristics of the proceeding vehicle is estimated based on a predicted longitudinal acceleration and/or lateral acceleration, which will act on the proceeding vehicle.

3. Method according to claim 1, wherein
   estimating or determining a driving characteristics of the proceeding vehicle comprises estimating or determining a lateral acceleration ($G_{Y\_EST\_PV}$) and/or longitudinal acceleration acting, during cornering, on the proceeding vehicle, and
   wherein the one or more setting parameters ($C_{XY}$; $T_S$; $C_{XY\_PV}$; $T_{S\_PV}$) for the calculation of the longitudinal acceleration target value ($G_{XT\_PGVC}$) are set based on the estimated or determined lateral acceleration ($G_{Y\_EST\_PV}$) and/or the estimated or determined longitudinal acceleration acting on the proceeding vehicle during cornering.

4. Method according to claim 1, wherein
   determining the longitudinal acceleration target value ($G_{XT\_PGVC}$) on the basis of a lateral acceleration ($G_Y$; $G_{Y\_PV}$) of the controlled vehicle and one or more setting parameters ($C_{XY}$; $T_S$; $C_{XY\_PV}$; $T_{S\_PV}$) is performed in one of a plurality of setting modes,
   wherein the one or more setting parameters are set differently in each of the plural setting modes such that an average lateral acceleration and/or a maximum lateral acceleration acting on the controlled vehicle during cornering is different for each of the plural setting modes.

5. Method according to claim 1, wherein
   the one or more setting parameters comprise at least one gain factor ($C_{XY\_PV\_D}$; $C_{XY\_D}$) for control of negative longitudinal acceleration of the vehicle, wherein an absolute value of the longitudinal acceleration target value ($G_{XT\_PGVC}$) increases with increasing gain factor ($C_{XY\_PV\_D}$; $C_{XY\_D}$) and decreases with decreasing gain factor ($C_{XY\_PV\_D}$; $C_{XY\_D}$), and
   wherein setting the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated lateral acceleration ($G_{Y\_EST\_PV}$) acting on the proceeding vehicle during cornering comprises setting the at least one gain factor ($C_{XY\_PV\_D}$; $C_{XY\_D}$) for control of negative longitudinal acceleration of the vehicle based on a function of the estimated lateral acceleration ($G_{Y\_EST\_PV}$) acting on the proceeding vehicle during cornering, wherein the at least one gain factor ($C_{XY\_PV\_D}$; $C_{XY\_D}$) for control of negative longitudinal acceleration of the vehicle as a function of the estimated lateral acceleration ($G_{Y\_EST\_PV}$) acting on the proceeding vehicle during cornering decreases with increasing absolute value of the estimated lateral acceleration ($G_{Y\_EST\_PV}$) acting on the proceeding vehicle during cornering.

6. Method according to claim 1, wherein
   the one or more setting parameters comprise at least one gain factor ($C_{XY\_PV\_A}$; $C_{XY\_A}$) for control of positive longitudinal acceleration of the vehicle, wherein an absolute value of the longitudinal acceleration target value ($G_{XT\_PGVC}$) increases with increasing gain factor ($C_{XY\_PV\_A}$; $C_{XY\_A}$) and decreases with decreasing gain factor ($C_{XY\_PV\_A}$; $C_{XY\_A}$), and
   wherein setting the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated lateral acceleration ($G_{Y\_EST\_PV}$) acting on the proceeding vehicle during cornering comprises setting the at least one gain factor ($C_{XY\_PV\_A}$; $C_{XY\_A}$) for control of positive longitudinal acceleration of the vehicle based on a function of the estimated lateral acceleration ($G_{Y\_EST\_PV}$) acting on the proceeding vehicle during cornering, wherein the at least one gain factor ($C_{XY\_PV\_A}$; $C_{XY\_A}$) for control of positive longitudinal acceleration of the vehicle as a function of the estimated lateral acceleration ($G_{Y\_EST\_PV}$) acting on the proceeding vehicle during cornering increases with increasing absolute value of the estimated lateral acceleration ($G_{Y\_EST\_PV}$) acting on the proceeding vehicle during cornering.

7. Method according to claim 1, wherein
determining the longitudinal acceleration target value ($G_{XT\_PGVC}$) comprises determining a second longitudinal acceleration target value ($G_{XT\_GVC}$) being calculated on the basis of a determined lateral acceleration ($G_Y$) and a corresponding lateral jerk ($\dot{G}_Y$) of the vehicle during cornering.

8. Method according to claim 1, wherein
determining the longitudinal acceleration target value ($G_{XT\_PGVC}$) comprises determining a third longitudinal acceleration target value ($G_{XT\_PV}$) being calculated on the basis of an estimated lateral acceleration ($G_{Y\_PV}$) of the vehicle at a preview point, which is located ahead of the controlled vehicle at a predetermined preview distance ($L_{pv}$) or at a preview distance ($L_{pv}$) which is calculated on the basis of a predetermined preview time ($t_{pv}$) and the current speed of the vehicle, the estimated lateral acceleration ($G_{y\_est}$) at a preview point being calculated on the basis of an estimation of curvature of the road at the preview point and the current speed of the controlled vehicle.

9. Apparatus for performing driving assistance for a controlled vehicle moving in a longitudinal direction on a road according to the method as described in claim 1, comprising:
longitudinal acceleration target value determining means (120) for determining a longitudinal acceleration target value ($G_{XT\_PGVC}$) on the basis of a lateral acceleration ($G_Y$; $G_{Y\_PV}$) of the controlled vehicle and one or more setting parameters ($C_{XY}$; $T_S$; $C_{XY\_PV}$; $T_{S\_PV}$), and
longitudinal acceleration control means (100) for controlling a longitudinal acceleration ($G_X$) of the controlled vehicle on the basis of the calculated longitudinal acceleration target value ($G_{XT\_PGVC}$),
wherein
driving characteristics determining means (240) for estimating or determining driving characteristics of a proceeding vehicle, which moves in the longitudinal direction on the road ahead of the controlled vehicle, and
setting means (110) for setting the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated or predicted driving characteristics of the proceeding vehicle.

10. Method according to claim 2, wherein
determining a speed of the proceeding vehicle,
wherein the lateral acceleration ($G_{Y\_EST\_PV}$) acting on the proceeding vehicle is estimated based on the determined speed of the proceeding vehicle and curvature information.

11. Method according to claim 2, wherein
determining a position of the proceeding vehicle, and
determining a curvature of the road at the position of the proceeding vehicle based on map data,
wherein the lateral acceleration ($G_{Y\_EST\_PV}$) acting on the proceeding vehicle is estimated based on the determined speed of the proceeding vehicle and the determined curvature of the road at the position of the proceeding vehicle.

12. Method according to claim 4, wherein
the plural setting modes comprise at least a first setting mode (setting 1; setting 2; setting 3) and a second setting mode (setting 2; setting 3; setting 4), an average lateral acceleration and/or a maximum lateral acceleration acting on the controlled vehicle during cornering being larger in the second setting mode than in the first setting mode,
wherein setting the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated lateral acceleration ($G_{Y\_EST\_PV}$) acting on the proceeding vehicle during cornering comprises selecting the first setting mode (setting 1; setting 2; setting 3), if an absolute value of the estimated lateral acceleration ($G_{Y\_EST\_PV}$) acting on the proceeding vehicle is smaller than a threshold value ($G_{y1}$; $G_{y2}$; $G_{y3}$), and selecting the second setting mode (setting 2; setting 3; setting 4), if the absolute value of the estimated lateral acceleration ($G_{Y\_EST\_PV}$) acting on the proceeding vehicle is larger than the threshold value ($G_{y1}$; $G_{y2}$; $G_{y3}$).

13. Method according to claim 7, wherein
the longitudinal acceleration target value ($G_{XT\_PGVC}$) is determined based on the second longitudinal acceleration target value ($G_{XT\_GVC}$) and the third longitudinal acceleration target value ($G_{XT\_PV}$).

14. Method according to claim 11, wherein
the position of the proceeding vehicle is determined based on position data received from the proceeding vehicle.

15. Method according to claim 11, wherein
determining a position of the controlled vehicle, and
determining a distance from the controlled vehicle to the proceeding vehicle,
wherein the position of the proceeding vehicle is determined based on the position of the controlled vehicle and the determined distance to the proceeding vehicle.

16. A non-transitory computer readable medium storing computer instructions, which instructions when executed cause a vehicle control apparatus to:
determine a longitudinal acceleration target value ($G_{XT\_PGVC}$) on the basis of a lateral acceleration ($G_Y$; $G_{Y\_PV}$) of a controlled vehicle and one or more setting parameters ($C_{XY}$; $T_S$; $C_{XY\_PV}$; $T_{S\_PV}$),
control a longitudinal acceleration ($G_X$) of the controlled vehicle on the basis of the calculated longitudinal acceleration target value ($G_{XT\_PGVC}$),
estimate or determine a driving characteristics of a proceeding vehicle which moves in the longitudinal direction on the road ahead of the controlled vehicle, and
set the one or more setting parameters ($C_{XY}$; $T_S$; $C_{XY\_PV}$; $T_{S\_PV}$) for the calculation of the longitudinal acceleration target value ($G_{XT\_PGVC}$) based on the estimated or predicted driving characteristics of the proceeding vehicle.

* * * * *